US006920390B2

(12) United States Patent
Mallet et al.

(10) Patent No.: US 6,920,390 B2
(45) Date of Patent: Jul. 19, 2005

(54) SURFACE TRAFFIC MOVEMENT SYSTEM AND METHOD

(75) Inventors: Robert Mallet, Rockville, MD (US); Robert Calzetta, Baltimore, MD (US)

(73) Assignee: Technology Planning Incorporated, Rockville, MD (US)

(*) Notice: Subject to any disclaimer, the term of this patent is extended or adjusted under 35 U.S.C. 154(b) by 0 days.

(21) Appl. No.: 10/147,972

(22) Filed: May 20, 2002

(65) Prior Publication Data

US 2003/0009278 A1 Jan. 9, 2003

Related U.S. Application Data

(60) Provisional application No. 60/291,644, filed on May 18, 2001.

(51) Int. Cl.$^{7}$ ................................................ G01C 21/00

(52) U.S. Cl. ....................... 701/120; 701/117; 701/211; 340/988; 340/990; 340/995

(58) Field of Search ................................ 701/120, 117, 701/200, 211; 73/178 R; 340/988, 990, 995

(56) References Cited

U.S. PATENT DOCUMENTS

| | | | | |
|---|---|---|---|---|
| 4,122,522 A | | 10/1978 | Smith | 364/427 |
| 5,530,440 A | | 6/1996 | Danzer et al. | 340/933 |
| 5,670,961 A | | 9/1997 | Tomita et al. | 342/36 |
| 6,028,537 A | * | 2/2000 | Suman et al. | 340/988 |
| 6,144,915 A | | 11/2000 | Shiomi et al. | 701/120 |
| 6,178,378 B1 | * | 1/2001 | Leibold | 701/202 |
| 6,182,005 B1 | * | 1/2001 | Pilley et al. | 701/120 |
| 6,278,940 B1 | * | 8/2001 | Endo | 701/209 |
| 6,282,488 B1 | | 8/2001 | Castor et al. | 701/120 |
| 6,381,537 B1 | * | 4/2002 | Chenault et al. | 701/209 |
| 6,393,360 B1 | * | 5/2002 | Ma | 701/208 |
| 6,522,264 B1 | * | 2/2003 | Stewart | 340/945 |
| 6,526,335 B1 | * | 2/2003 | Treyz et al. | 701/1 |

* cited by examiner

*Primary Examiner*—William A. Cuchlinski, Jr.
*Assistant Examiner*—Olga Hernandez
(74) *Attorney, Agent, or Firm*—Arent Fox

(57) ABSTRACT

A Surface Movement Area/Runway Traffic and Surface Area Flow Tool with Runway Incursion Protection System reduces runway incursions due to lost or disoriented aircraft, navigation in low visibility conditions, unfamiliarity with local procedures and airport layouts, and truncated or misunderstood clearances or other frequency congestion related communication and workload problems. SMART Board surface displays are used to provide route guidance instructions to aircraft at ramp and taxiway intersections, confirm to for pilots that their aircraft is at the correct location and is in the assigned queue and sequence before entering active runways, visual confirmation of runway clearances to aircraft and vehicles at all runway entrances, and lessening frequency congestion on Ground and Local communications channels. The system includes an Electronic Flight Data System to generate messages. Sensors and a wireless LAN are used to provide data from the system to all aircraft and vehicles on the surface movement area of an airport.

30 Claims, 20 Drawing Sheets

SMART Board: EKEJ

Intersection Nomenclature:

<u>E</u> <u>K</u> <u>E</u> <u>J</u>

Where E = Direction aircraft is facing to read sign
K = The path the aircraft is ON (1-3 alphanumeric characters)
EJ = The path that crosses the aircraft's path (1-3 alphanumeric characters)

| Route Name | Start Name | Destination Name | Intersections along Route showing Turn indicators | | | | | | | |
|---|---|---|---|---|---|---|---|---|---|---|
| | | | EK 7L | NL EK | NL EJ | NL Z | NL Y | NL EH | NL EG | NL EF |
| K7_17RO | K7 | EEF17R | ← | ↑ | ↑ | ↑ | ↑ | ↑ | ↑ | → |

| Route Name | Start Name | Destination Name | Intersections along Route showing Turn indicators | | | | | | | |
|---|---|---|---|---|---|---|---|---|---|---|
| | | | EK7 K | SK EL | SKE A | SK B | SK A | SK EQ | SK ER | |
| K7_35LO | K7 | EER35L | → | ↑ | ↑ | ↑ | ↑ | ↑ | ← | |

Figure 14

SURFACE TRAFFIC MOVEMENT SYSTEM AND METHOD

This application claims benefit of U.S. Provisional Patent Application No. 60/291,644 filed on May 18, 2001.

FIELD OF THE INVENTION

This invention relates to surface traffic management systems, and more particularly to the visual depiction of selected route guidance of individual vehicles, such as identified aircraft.

BACKGROUND OF THE INVENTION

Runway Incursions occur when aircraft or vehicles enter onto a runway and conflict with aircraft cleared to land or take off on the same runway. Runway incursions are caused by human error, either by an Air Traffic Controller, a pilot, or a vehicle operator. One or a combination of five primary factors cause operational errors and deviations from procedures and directions: position uncertainty and poor ground navigation; incorrect; incomplete or misinterpreted communications; improper clearances; lack of situational awareness; and human error.

Safety compromising incidents between aircraft are an insidious problem. They are difficult to anticipate and difficult to analyze statistically, and they occur randomly with increasing frequency. In 1988 reported runway incursions totaled 187. By 1999, the total increased to 322. The reaction time required for a pilot or air traffic tower controller to detect, evaluate, and resolve a conflict is extremely short. The incident develops quickly amongst the tower controller's responsibilities to monitor and separate traffic, sequence arrivals and departures, issue weather and traffic advisories, coordinate with other controllers, communicate instructions to pilots, and maintain full usage of runway flow capacities. Pilots are equally busy preparing for takeoff or guiding the aircraft to the active runway, taxiing on a busy airport surface all the while communicating with Air Traffic Controllers and/or listening to other communications to maintain situational awareness. Critical in this environment is the need to maximize the time between recognition of a safety hazard and the execution of remedial action.

At any airport, many vehicle movement events are occurring simultaneously. Staging of aircraft for arrival and departure and providing for separation assurance of vehicles on the surface movement area (runway incursion avoidance) requires continuous awareness of dynamically developing situations, fast and accurate decision making and the ability to transform decisions into action.

To reduce runway incursions due to lost or disoriented aircraft, conflicts with aircraft landing navigation in low visibility conditions, unfamiliarity with local procedures and airport layouts, and truncated or misunderstood clearances or other frequency congestion related communication and workload problems, the present invention utilizes guidance display means such as electronic message boards or visual aids that provide improved surface navigational awareness and surface movement clearance validation by: 1) displaying route guidance instructions to aircraft at ramp and taxiway intersections, confirming for pilots that their aircraft is at the correct location and is in the assigned queue and sequence before entering active runways; 2) providing visual confirmation of verbally delivered runway clearances to aircraft and vehicles at all runway entrances; and 3) lessening frequency congestion on ground and local communications channels.

The inventors of the present invention have analyzed surface movement operations and runway incursion incidents with the objective of creating solutions that reduce the likelihood of a safety incident developing in the first place. Prior solutions such as sensors that provide collision avoidance advisories subject to limited reaction times (measured in seconds) to correct a safety incident already in progress are inadequate because separation standards have already been violated. Runway Land and Hold Short Lighting Systems are helpful for go-no-go situations but are not capable of presenting necessary safety-related situational information or directional information. Prior art solutions do not take into account the complexities and interdependencies of surface movement operations. The SMART Board System of the present invention has been designed to overcome the limitations of the prior art, and in so doing, also increases the efficiency of vehicle movement and provides capacity gains for an airport.

SUMMARY OF THE INVENTION

The present system virtually eliminates navigational and runway usage problems by providing visual guidance to aircraft and vehicles on the ground using detectors located on the runway/taxiway to detect the presence of an aircraft or vehicle and to provide specific guidance to the aircraft or vehicle via guidance display means such as electronic message boards or visual aids. The system displays unique taxi routes for each vehicle traveling on the runways/taxiways, and direct the aircraft pilot by the guidance display means at each traffic intersection as to whether his aircraft may enter and in which direction to proceed to attain his destination on the ground via such route. The system is designed to provide positive ground position information to ground traffic (aircraft and vehicles) instead of assumed location by visual sightings, to automatically keep track of all ground traffic operating on the runways/taxiways. The system permits an aircraft or vehicle operator, without any associated cooperative equipment, to report the message board key location identifier via any normal verbal communications equipment, thus locating the specific vehicle to a particular location on the airport surface area. For vehicles equipped with digital message signaling devices, the send/receive transceiver associated with the identified SMART Board is capable of receiving the vehicle signal and transmitting the data to an Air Traffic Control tower (central control facility). The message board key location identifier is an automatically generated name for a runway/taxiway position that changes on a periodic basis to preclude the pilot or vehicle operator from reporting an assumed location. That is, a unique location code can be generated daily by the system and visible on the message boards only at the specified locations to require a pilot to actually be at the location in order to read the key location identifier code. This capability is enabled by the airport-wide wireless transmission component of the system, or by a fixed wire equivalent. Via this capability and sensor generated positional data, the system automatically keeps track of all ground traffic operating on the runways/taxiways.

Thus, an object of the present invention is to address the causes of operational incidents in airport movement areas. The present invention provides for both Air Traffic Controllers and vehicles positive, unambiguous situational awareness, airport surface location, routing and air traffic control instructions. Thus, unsafe and incorrect vehicle movements are quickly recognized and less likely to occur. The "Silent Coordination" feature materially reduces voice frequency congestion because voice communication is used less to correct ambiguities or request repeated clearances. The System of the present invention has no airport-specific limitations and has additional advantages in supporting airport route changes necessitated by construction, weather and temporary conditions. The system can deliver critical aviation safety data to ground traffic at both towered and non-towered airports. Data may include advisories, Notices to Airmen (NOTAMS), Navigation Aids (NAVAIDs), status, restrictions and current airport conditions. The present invention's effectiveness is independent of aircraft type or crew proficiency and requires no vehicle equipage. The concepts are easily understood (as are the SMART Board messages) and require no extensive or sophisticated training. The System of the present invention is designed to be compatible with current Air Traffic Control (ATC) procedures. In a preferred embodiment, "controller" refers to the Air Traffic Controller.

The System of the present invention includes: complimentary current solutions designed to sense and react to incidents underway (effects) with solutions which address the precursor conditions (the causes) which lead to runway incursions such as—lack of situational awareness, misunderstanding of directions, aircraft location incorrect and/or executing unauthorized or unsafe aircraft movements. The present invention is fully compatible with current operational processes and constraints to assure acceptance and to effect minimal lead-time to operational deployment. There are no workload increases on Air Traffic Controller or pilots, and the "Silent Coordination" feature reduces Air Traffic Controller's workload and frequency congestion.

The System of the present invention includes five main components: 1) sensors, 2) surface movement area/runway traffic (SMART) Board Surface Displays, 3) wireless LAN communicators, 4) Electronic Flight Data System (EFDS) processor for electronic flight management, and 5) Surface Area Flow Tool with Runway Incursion Protection (SAFTRIP). In the preferred embodiment, the system of the present invention includes: programmable message boards installed next to taxiways, ramps and runway intersections; magnetic inductive loop sensors installed in taxiways to detect vehicle and movement direction; and wireless LAN transceivers that provide connectivity between loop sensors, sign boards, and EFDS interface. The system is designed to accept a wide variety of sensor inputs in addition to loop sensors.

According to one aspect of the present invention, the SMART Board Surface Displays are comprised of lighted bright LED alphanumeric display signs that mark intersections, provide directions, and act as a positive confirmation to a pilot that the aircraft is "on course." As such, airports with frequent fog, rain, or snow conditions can benefit from lighted navigational guidance to all aircraft in low visibility conditions. By providing positive feedback of correct route and position, runway incursions from disoriented pilots are reduced. In addition, since the voice frequency is used less for navigational assistance, the accompanying distraction is reduced, helping maintain the focus on efficient and safe runway operations.

SMART Board Surface Displays are constructed from commercial-off-the-shelf components (COTS), which operate in environments similar to airports. Computer equipment is off-the-shelf as are the wireless transmission components. Application specific software has an architecture that allows for easy portability to different hardware platforms which creates an opportunity for standardized equipment types and thus realized maintenance and other cost savings. Airport adaptation parameters are built into the software.

The present invention has no limitations due to airport size (scalability), complexity or terrain, and operates at Air Traffic Controlled towered airports, airports having limited tower operations and non-towered airports. The present invention has several airport and aircraft specific advantages for curtailing runway incursions. The present invention can be integrated with existing airport surface detection systems, for example, vehicle movement sensors such as Airport Surface Detection Equipment (ASDE), ASDE-X, Global Position Systems (GPS) and multilateration systems to detect additional collision avoidance and route conformance monitoring events. Although SMART Board Surface Displays provide navigation and control services in virtually any airport in which a source of inbound and outbound aircraft are available, there are three areas in which SMART Board Surface Displays are particularly effective: 1) airports with frequent low-visibility conditions or a complex surface routing environment; 2) airports with a high percentage of mixed general aviation, business, sport, and airline traffic, and 3) airports that undergo frequent changes in flow or are in the process of making configuration changes to the surface movement area.

Since there are no special equipment requirements, the present invention advantageously accommodates a mix of aircraft types and operator proficiency. Airports having a significant mix of aircraft types will be able to enjoy an increased level of runway incursion safety by knowing more positive guidance will be delivered to all aircraft, regardless of equipage, reducing errors from lost aircraft and providing an extra measure of runway occupancy status to all operators.

Another benefit of the SMART Board Surface Displays of the present invention is assisting in "turning an airport around" (defined as changing the traffic flow direction generally due to wind shifts) and setting up semi-permanent routing to accommodate construction and temporary weather or traffic flow conditions such as deicing procedures or accommodating "parking lot" conditions when congested. SMART Board Surface Displays can easily accommodate new routing and ad hoc changes in flow for temporary conditions. As the signs visually provide new navigational directions, the voice frequencies do not need to be shared with this duty and can be used to direct other traffic. SMART Board Surface Displays can deliver weather-related surface conditions and temporary routing instructions to pilots for deicing operations.

To help reduce runway incursions, SMART Board Surface Displays provide additional situational awareness to aircraft in dependent runway operations, such as parallel and intersecting runways (Land and Hold Short Operations-LAHSO). SMART Board Surface Displays maintain safety and surface flow around and through temporary construction zones. SMART Board Surface Displays can be adapted to deliver wake vortex advisories and route instructions dependent upon aircraft type or class, equipped or not. Aircraft type identifiers are flight plan components already in the SMART Board system.

BRIEF DESCRIPTION OF THE DRAWINGS

FIG. 14 is a Mapping Table According to the Present Invention.

DETAILED DESCRIPTION OF THE INVENTION

The System of the present invention includes five main components: 1) sensors, 2) surface movement area/runway traffic (SMART) Board Surface Displays, 3) wireless LAN communicators, and 4) Electronic Flight Data System (EFDS) processor for electronic flight management, and 5) Surface Area Flow Tool with Runway Incursion Protection (SAFTRIP). In the preferred embodiment, the system of the present invention includes: programmable message boards installed next to taxiways, ramps and runway intersections; radar sensors or magnetic inductive loop sensors installed in taxiways to detect vehicle and movement direction; and wireless LAN transceivers that provide connectivity between loop sensors, sign boards, and EFDS interface. The system is designed to accept a wide variety of sensor inputs in addition to loop and radar sensors.

Turning now to the sensor component, Display Message Driver Processor (DMDP) module of the EFDS generates SMART Board Surface Display messages based on sensor signals processed by the External System Interface (ESI) module, indicating vehicle presence for data collection and fault detection. In the preferred embodiment, inductive loop sensor technology is employed. The loop sensors are located at key locations or intersections to detect aircraft and ground vehicles. For example, two sensor loops per taxiway provide the advantages of vehicle directional information, redundancy in case of failure and added safety alerts if two vehicles on the same taxiway are approaching each other. However, there are numerous devices that may be utilized for detecting the presence of an aircraft such as infrared, radio frequency, micro-wave, trip-wires, or radar sensors.

Figure 1:
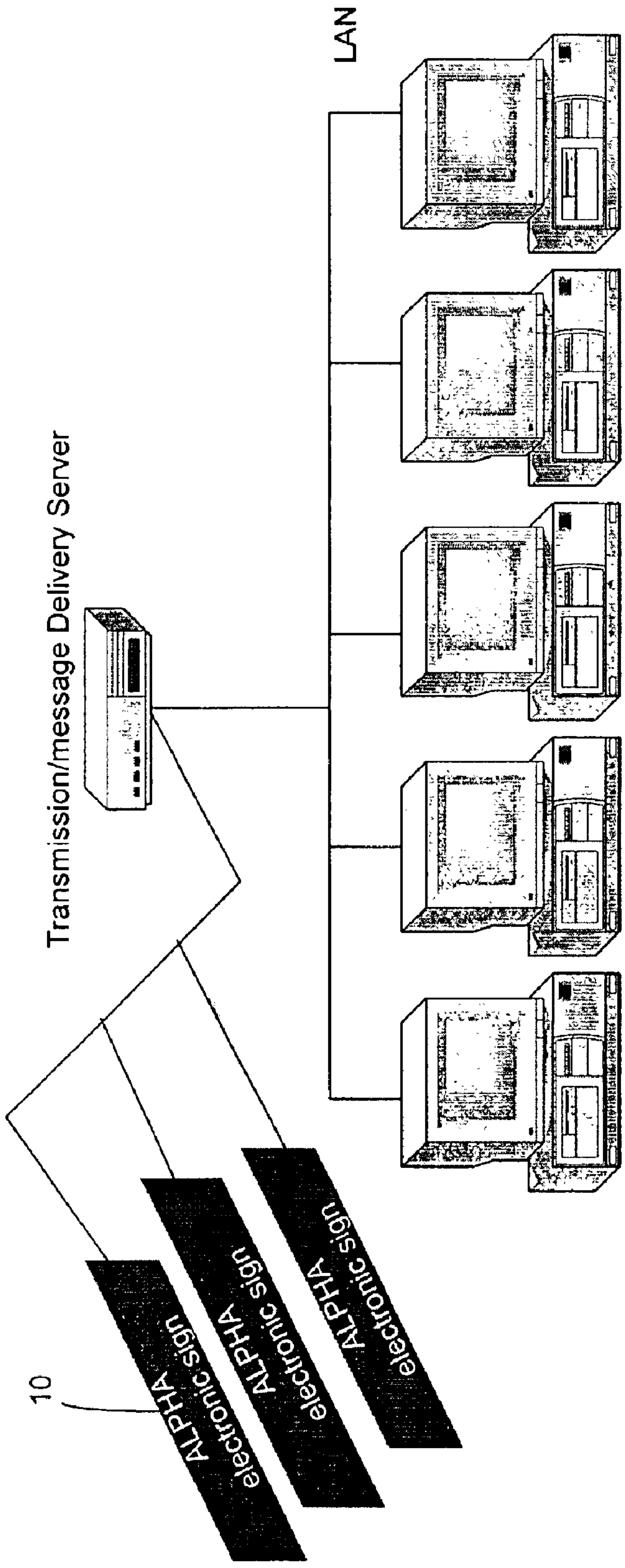
FIG. 1 is a SMART Board Surface Display Configuration

The SMART Board Surface Displays are the second main component of the System of the present invention. As shown in FIG. 1, SMART Board Surface Displays 10 are, for example, a wireless network of LED-type alphanumeric signs. These displays are installed at locations such as ramps, taxiways, and runway intersections. The SMART Board Surface Displays provide a visual confirmation of location, route assignment, taxi guidance, and runway occupancy status to aircraft at all runway intersections.

The SMART Board surface displays perform in all situations such as night visibility, bright daylight visibility, cockpit visibility angles at which the programmable SMART Board surface displays would be viewed, and the most visible color that would in no way blend in with any possible background at any location. Preferably, the SMART Board surface displays are operated and messages activated through a wireless system, which also provides for ease of installation. However, if required, the system of the present invention can also be hard wired.

In the preferred embodiment, the SMART Board surface display is comprised of the programmable SMART Boards and transceivers. For example, the SMART Board surface displays may be ADAPTIVE MICROSYSTEMS' products manufactured to SMART Board specifications such as an Adaptive Microsystems AlphaEclipse outdoor 11 foot 10 inch sign. Signs may vary in size, for example, from eight feet to seventeen feet. Transmitters such as CISCO 350 wireless bridges and antennas operating at a set frequency range may be utilized. To avoid electronic interference, special transmits/receives frequencies have been assigned and the system will meet these requirements. In the present invention, wireless transmissions will use a frequency band of 5 GHz, preferably operating between 5.09 GHz and 5.15 GHz. This transmission frequency does not interfere with other electronic equipment located on the airport surface.

The SMART Board surface display messages are derived from the sensor inputs and/or surface location and route assignment activities created by Air Traffic Control tower personnel. Thus, the SMART Board surface displays impose no increase in Air Traffic Controller workload. The SMART Board system is a means of conveying information that is created by using the invention's Electronic Flight Data System (EFDS) flight strip management functionality to assign aircraft location, route, destination and sequence, and to transfer control among tower positions. The SMART Board system converts flight data management activities into taxi directions and runway clearance information. As the Air Traffic Controllers work the aircraft across the surface via the electronic flight data management operations, the SMART Board surface displays assist by automatically sending the appropriate directions to the applicable surface displays. Pilots know if they are off the intended course when they no longer find their ID on the SMART Board surface displays. In essence, if the aircraft identification is not listed on the SMART Board surface display, then the aircraft is in the wrong location, prompting the pilot to coordinate further movement with Air Traffic Control (ATC) before the situation becomes an operational error.

Figure 2:
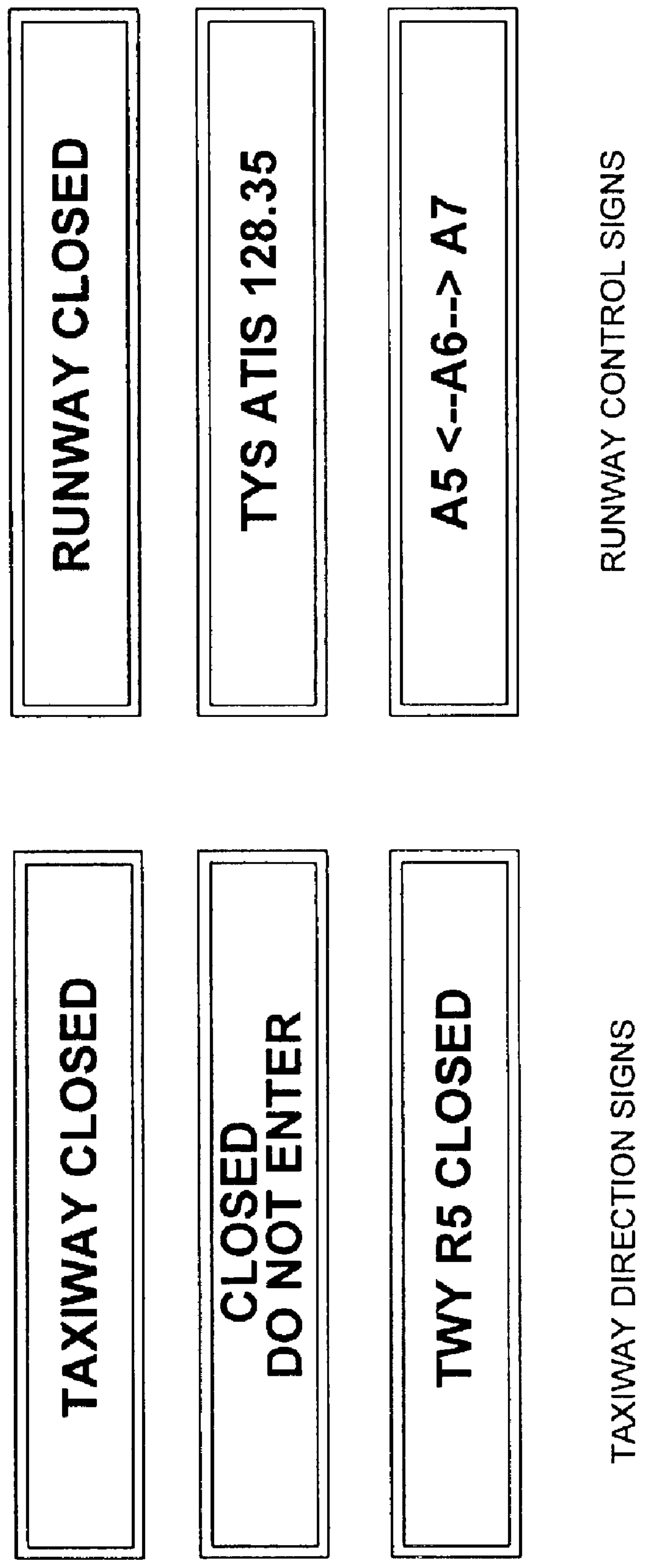
FIG. 2 is a Runway Control Sign-Message Application

As shown in FIG. 2, preferably two types of signs are utilized, taxiway direction signs and runway control signs. For example, taxiway direction signs are driven by Air Traffic Ground controller inputs and provide turn indications by aircraft ID at all intersections, runway control signs echo verbal clearances by aircraft ID with a visual control indication to specific aircraft. For example, runway control signs serve as runway status indicators (occupied or not) and confirm clearances and departure sequence. Following a departure, the next aircraft in sequence will move up. Anticipated delay, weather advisories, sequence changes, last minute flight plan amendments, aircraft recall, and other ad hoc information can also be sent to waiting aircraft.

The SMART Board surface displays are located at all key locations on the airport surface, i.e., all runway intersections, appropriate taxiway locations, any other locations as deemed necessary for safe ground operations.

Figure 3:
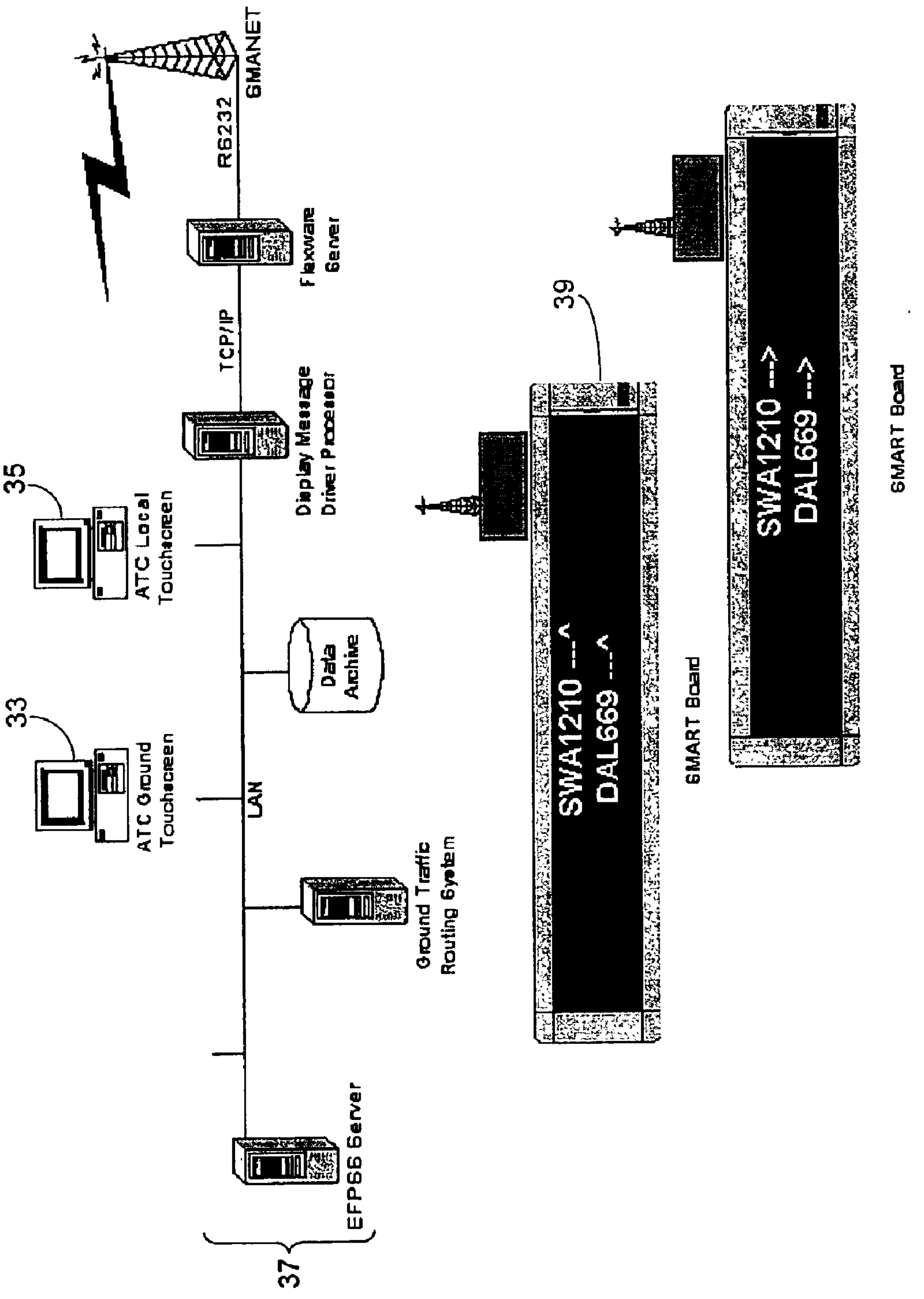
FIG. 3 is a Surface Movement Area Network Configuration

The Wireless LAN is the third main component of the SMART Board System. Wireless LAN communicators are transmitter/receiver pairs that allow the SMART Board surface display signs to be deployed at intersections without the need for hard cable installations. As shown in FIG. 3, Surface Movement Area Network (SMANET) is a network of secure communication transmitter/receiver units that compose a wireless LAN on the surface of the airport. The SMANET is constructed from Commercial-Off-The-Shelf (COTS) products. It is capable of two-way (send/receive) transmission which enables it to communicate with surface displays and with vehicles equipped with compatible communication units. This embodiment illustrates a basic configuration according to the present invention. This configuration identifies the main components used in delivering messages from a central control station to the message boards on the surface of the airport. The SMANET delivers information derived from Air Traffic Controller Ground Control 33 and Local Control 35, EFDS System 37, transmission units and Smart Board surface displays 39. The Wireless LAN is networked in a manner which supports multiple pathways for affiliation with a specific SMART Board. If a transmission pathway is temporarily blocked (due, for example, to a large aircraft in the vicinity of the SMART Board causing interference), the SMART Board system automatically selects an alternate pathway using the transmission capabilities of other SMART Boards to properly route the message.

The tower Air Traffic Controller uses, for example, a touch screen driven PC at each controller position for flight strip management. Separate positions can be consolidated into a single machine if desired. The flight strip on the screen shows aircraft in assigned sequence in each taxi and runway location with a colored indication of the time spent in the queues. Air Traffic Controllers see only operation-specific information, but always have access to full flight plan data. The present invention works within current flight data management operational procedures, requiring Air Traffic Controller interaction with touch screens to move and hand off aircraft.

Figure 4A:
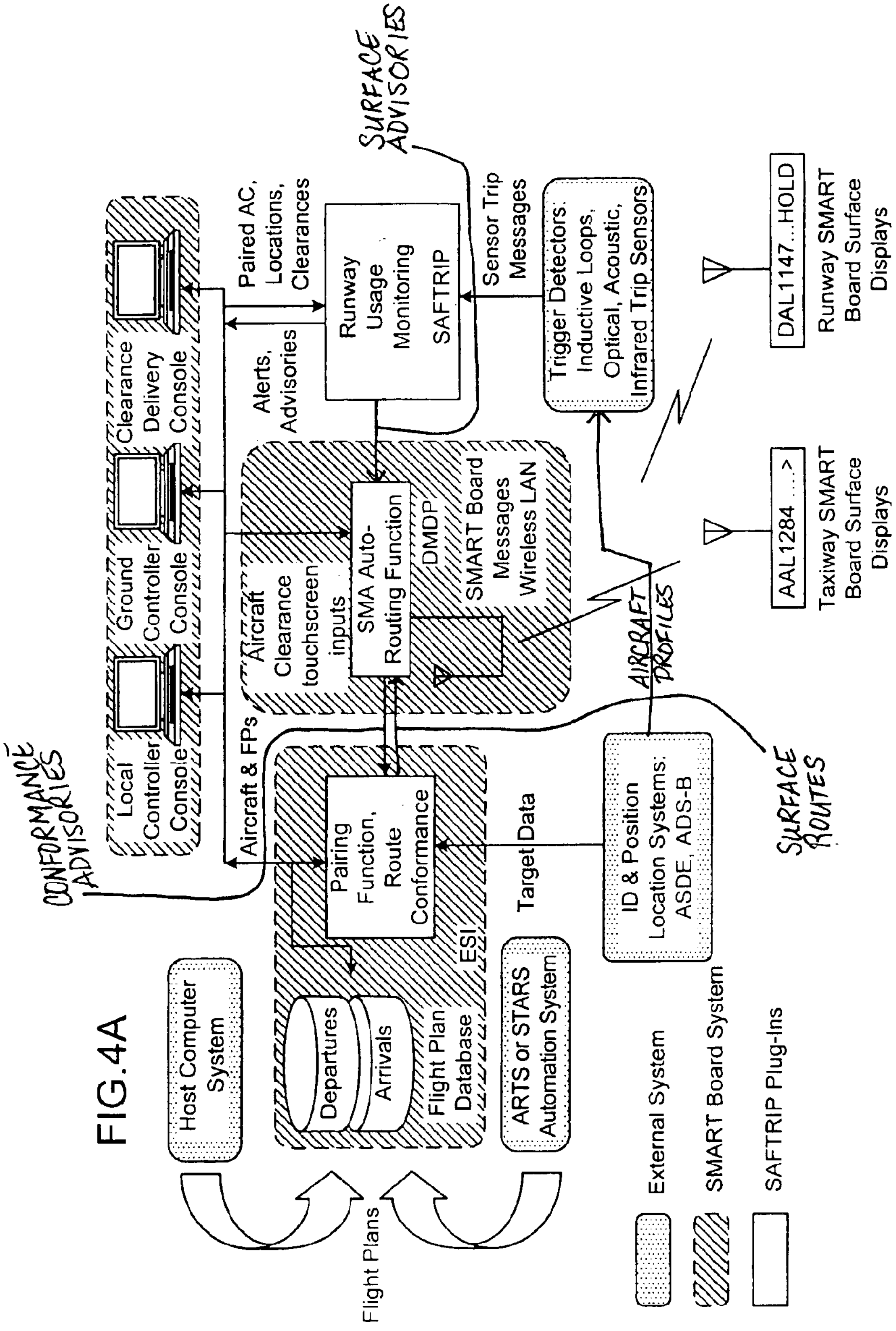
FIGS. 4A and 4B are Electronic Flight Data Systems According to the Present Invention Architectural Diagram.

FIG. 4A depicts the overall SMART Board Surface Movement Monitoring System Functional Architecture which illustrates the option of additional safety-related functionality; such as the Surface Area Flow Tool with Runway Incursion Protection (SAFTRIP) runway usage monitor. SAFTRIP is the fifth main component of the system of the present invention. The SAFTRIP component is a surface surveillance situational awareness tool that monitors surface movement activities, produces alerts if multiple simultaneous runway operations are in progress, and prepares runway conflict advisories for immediate use in the event of unexpected runway activity, thus increasing valuable crew response time. The SAFTRIP component also has the capability to monitor surface route conformance and issue advisories to the tower of aircraft not following assigned movement clearances. The SAFTRIP component is an automation tool that integrates all the inputs from airport surface sensors in one tool, interpreting the sensor inputs in terms of threats to the runway operation in progress and promotes teamwork between Air Traffic Ground and Local Controllers. As shown in FIG. 4A, for example, The SAFTRIP component monitors runway operations, alerts the Local Controller of any former or in-process runway commitments, validates route movement and runway sequence queues, and continuously formulates emergency runway incursion advisories in response to changing runway, taxiway and approach conditions. The SAFTRIP component can also be used as a semi-automated runway incursion prevention tool at airports without surface sensors. An abbreviated set of key reporting positions can be defined and manual entry of the progress of the active runway aircraft will be required by the Air Traffic Controller. The SAFTRIP component will still alert the Air Traffic Controller to former runway allocations and deliver the Expedite Operations advisories. As illustrated in FIG. 4A, the architecture also provides for the automatic delivery of messages to SMART Boards should the system be deployed at an airport where there is no Air Traffic Control tower or the tower is unmanned.

Figure 4B:
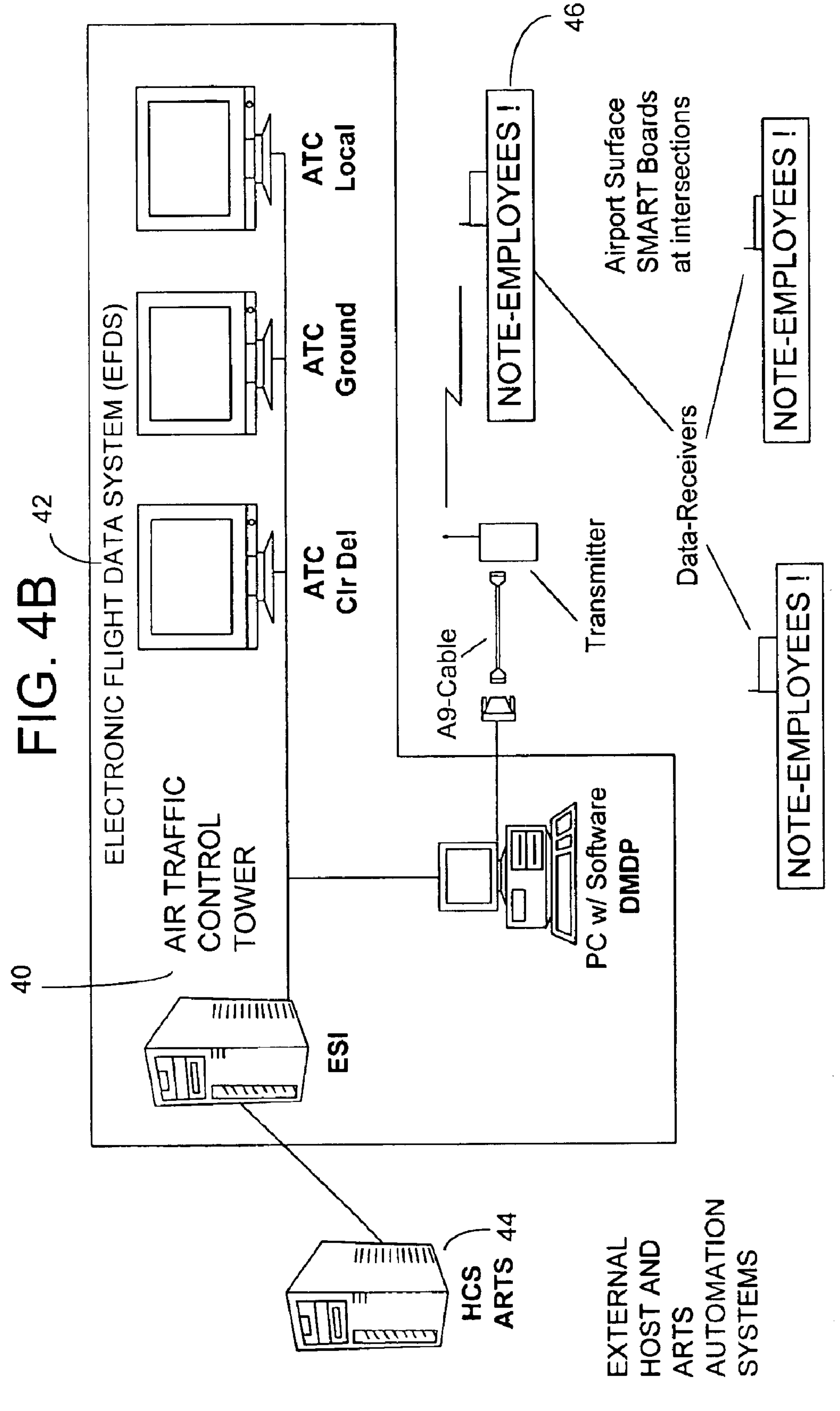

The Electronic Flight Data System is the fourth main component of the SMART Board System. As shown in FIG. 4B, EFDS contains the Air Traffic Controller Tower (ATCT) 40 and air traffic controller LAN stations 42, interfaced to the external HOST and ARTS systems 44 for departure and arrival information. EFDS sends the surface movement taxiway and runway instructions to the SMART Board surface display 46 via the Display Message Driver Processor (DMDP) and a wireless LAN.

Figure 5:
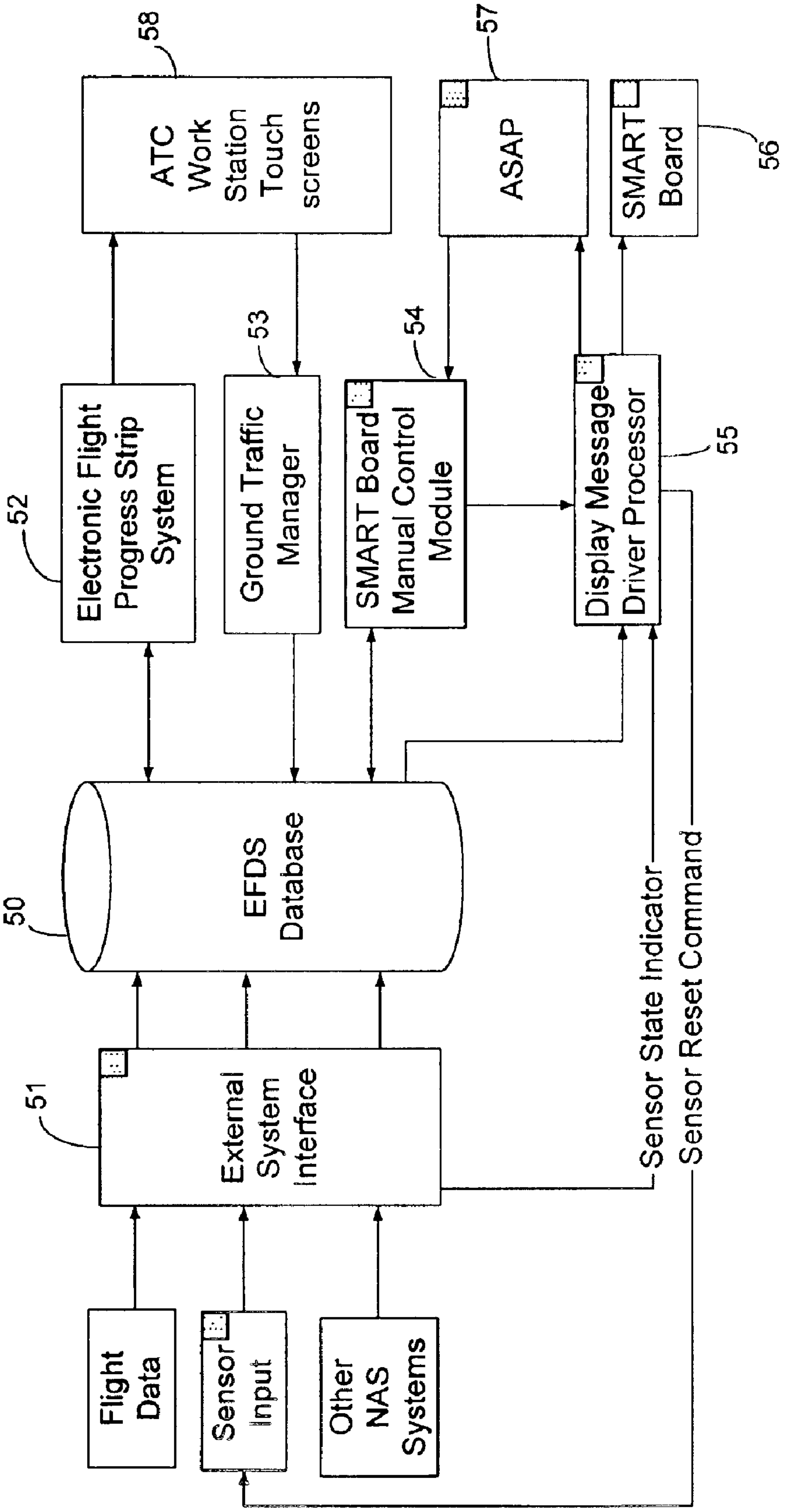
FIG. 5 is an software process Diagram According to the Present Invention.

In the preferred embodiment, the EFDS is comprised of an EFDS database 50 and software modules that access the database. A software process diagram, FIG. 5, depicts the interoperability of the EFDS with other components of the system. The EFDS sends the surface movement taxiway and runway instructions and sensor data to the SMART Boards surface displays via the DMDP which interfaces to the wireless transmission system.

The External System Interface 51 (ESI) interfaces the EFDS to external sources of flight data and aircraft track information. It also interfaces to surface aircraft movement and location sensors.

The Electronic Flight Progress Strip System 52 (EFPSS) is a software application module of the EFDS that drives the controller displays and processes the controller command input from the workstation on a client/server based LAN containing an adapted number of Air Traffic Control Positions within an ATCT. Each client is a workstation with a touchscreen, displaying operationally relevant data. The EFPSS is designed to minimize "heads-down time" and to improve controller situational awareness.

The Ground Traffic Manager 53 (GTM) reads the flight and route information and automatically determines the legs of the journey. It assesses potential conflicts and identifies all affected SMART Board surface displays and determines the message content for each SMART Board surface displays. GTM assembles the information for the Display Message Driver Processor.

The SMART Board Manual Control Module 54 (MCM) enables an operator in the Tower to select a message from a menu to place on one or a group of SMART Boards surface displays via the Airport Status and Alert Panel (ASAP) 57 or any Air Traffic Control work station 58. The MCM prepares data, such as sensor reset, ASAP sensor status presentation, and SMART Board activation. The method of data dissemination is configurable, whether to the database, or directly to the DMDP.

The Display Message Driver Processor 55 (DMDP) receives the individual aircraft/turn/intersection route information, sorts the messages by sign location, and sends the messages via the internal transmitter to receivers at each SMART Board surface display location. Each SMART Board surface display may have multiple aircraft using the route, and DMDP maintains the correct series of messages for all SMART Boards. DMDP continues to display the appropriate route messages to the designated SMART Board surface display until EFPSS sends a DELETE message to purge an aircraft route segment from the DMDP message lists. Each time the aircraft is cleared to the next surface location, the previous segment is automatically cleared from the displays. SMART Board surface display messages can also be cleared automatically with sensor data input or manually via operation action. DMDP controls the scrolling of commands to the SMART Board surface displays.

The EFDS server contains the main aircraft flight plan and movements database storage and communications applications as well as its own client application so that it may function as another Air Traffic Control position. Each client and the server itself is a workstation with a touch screen, operationally displaying an array of flight strips, arranged in a manner associated with surface movement area positions. Operator control buttons are also arranged on the screen, allowing an operator to access the flight plan, resequence aircraft in a queue, add/delete flight plans (for pop-ups), and handoff aircraft to another Air Traffic Control position, using a work area at the bottom of the screen. Strips can be passed from one workstation to the next just as manual strips are physically exchanged with the person working an adjacent Air Traffic Control position.

The EFDS screens are preferably touch sensitive and display ground movement queues and surface positions. A HOST computer feeds departures to the ramp position, and ARTS/STARS feeds arrivals to their respective Local Controller screens. As the Clearance Delivery workstation reads the clearance to an aircraft, the screen is touched to pick up the aircraft and designate which ramp position it will leave the ramp from. The Ground Control workstation will see the aircraft appear on its screen at the ramp position. As Ground plans the route to the chosen runway for departure, he/she touches the aircraft on the screen and touches the runway for departure. EFDS routes the aircraft to the departure end of the runway using a predetermined (adapted) route. EFDS sends the DMDP the route and intersection information, and DMDP passes the information to the SMART Boards to display the turn instructions for each aircraft assigned to the movement area routes by aircraft ID.

Additional software capabilities for the SMART board operations are: translation of flight data management movements into turn directions; Operator selection of default, ad hoc, or alternate routes; adaptation (tailoring the predetermined route turn instructions to a particular airport procedures) setup; and Specifying the flow configuration of the airport.

There are five basic embodiments of the present invention.

Figure 6:
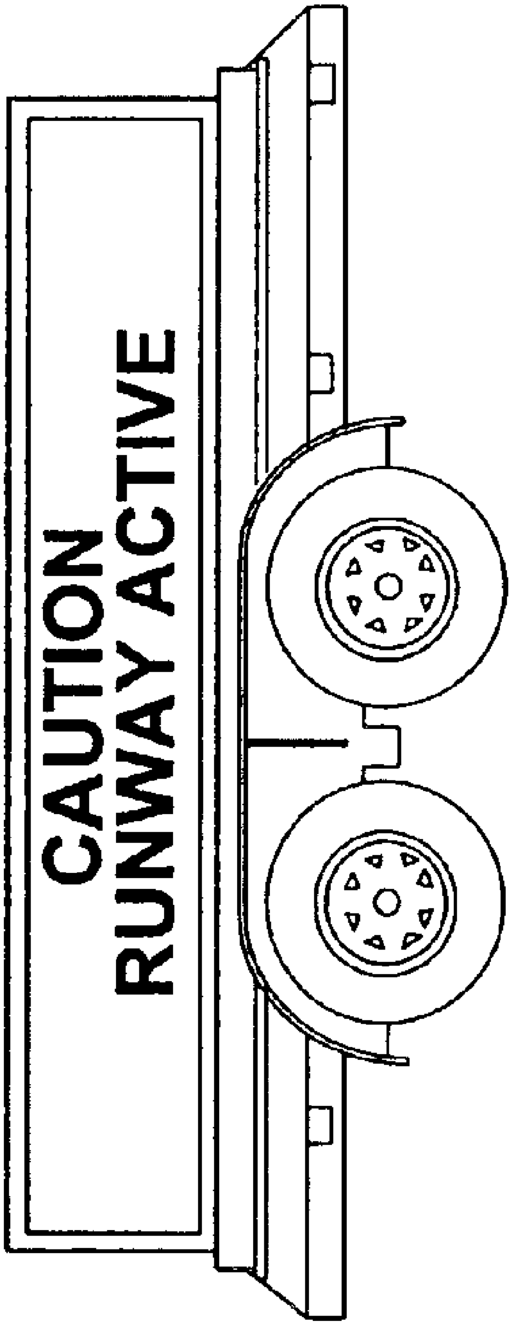
FIG. 6 is a Fixed Message Configuration SMART Board Surface Display According to an Embodiment of the Present Invention.

FIG. 6 illustrates an example of a FIXED MESSAGE—FIXED LOCATION CONFIGURATION. The SMART Board surface display replaces/augments fixed signage such as taxiway designators. The SMART Board surface displays can be fixed or mobile. Fox example, when mounted on a trailer, the SMART Board surface display can be placed to indicate a temporary surface condition. The SMART Board surface display is installed/located at the problem area displaying a fixed message of the user's choice. The Smart Board surface display would remain there until the problem was resolved or be made permanent. Messages could include warnings, fixed directions or taxiway designations.

Figure 7A:
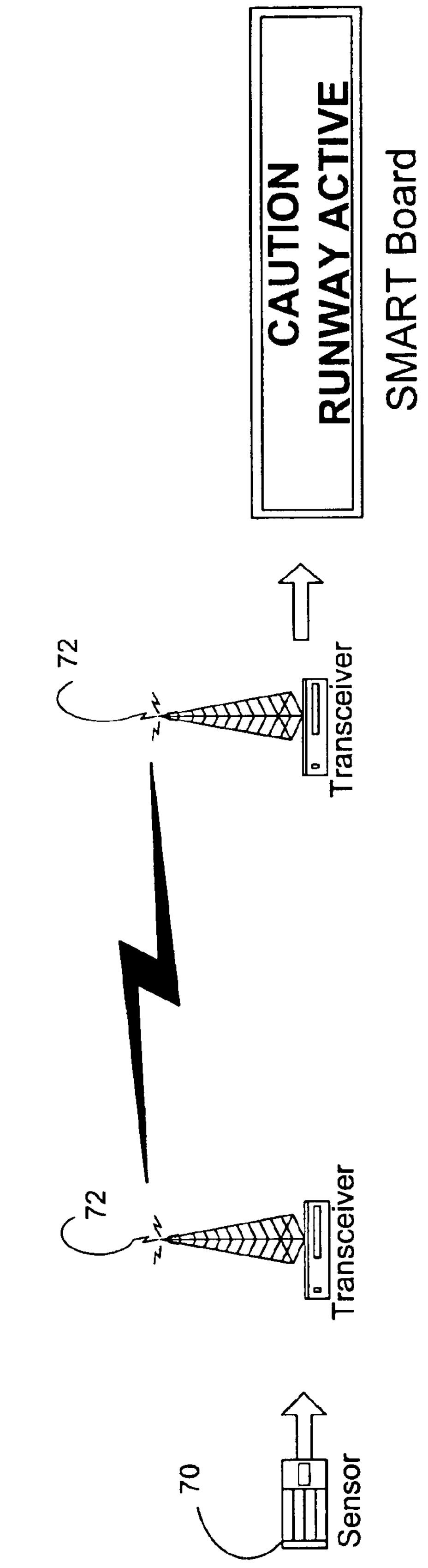
FIG. 7A is a Direct Sensor Actuation Configuration According to Another Embodiment of the Present Invention.

FIG. 7A illustrates the DIRECT SENSOR ACTIVATION CONFIGURATION. A sensor 70 (trip wire, in-round loop, radar) outputs a signal to the SMART Board surface display via a transceiver 72 to cause a message to be immediately displayed automatically. Upon receipt of a second signal or time-out, the SMART Board message can be reset automatically and be preprogrammed with any relevant message.

In this configuration, the sensor 70 output causes an immediate and automatic display of a fixed message on one or more SMART Board surface displays.

With the SMART Board surface displays located on the airport surface, the vehicle which tripped the sensor is immediately notified with an appropriate message. Where the message is sent to a computer, the same immediate notification is presented on the computer airport layout.

Figure 7B:
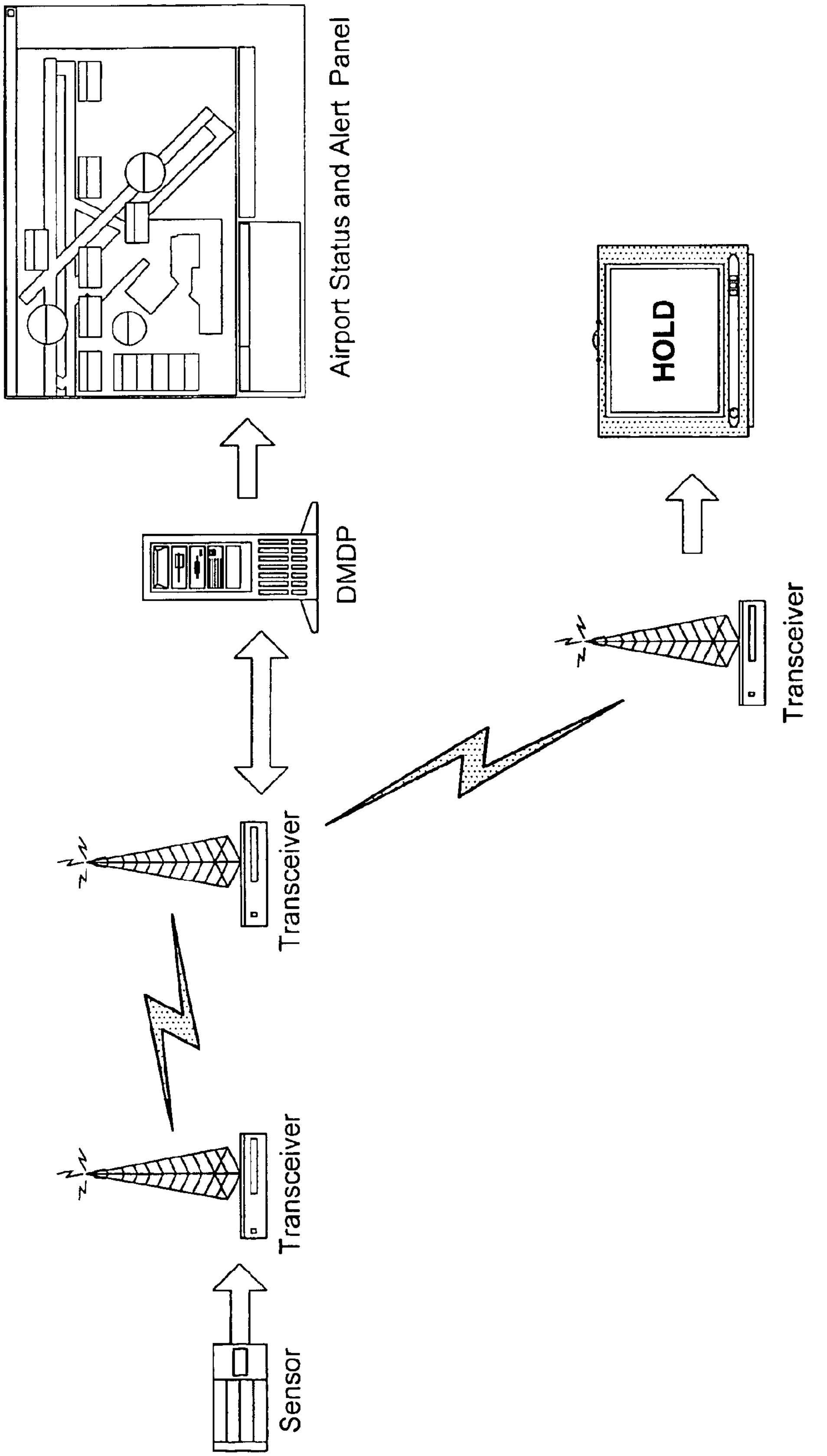
FIG. 7B is a Direct Sensor Actuation Configuration with Tower Notification According to Another Embodiment of the Present Invention.

The third configuration, FIG. 7B illustrates the DIRECT SENSOR ACTIVATION WITH TOWER NOTIFICATION CONFIGURATION. This is similar to the configuration in FIG. 7A but has the added capability of tower notification of the tripped sensor and its location. Where the message is sent to a computer, the same immediate notification is presented on the computer airport layout. In a towered airport, the sensor 70 signal can be sent to the tower cab and displayed on the Airport Status and Alert Panel (ASAP) 76. This panel will display the location of the tripped sensor and the energized SMART Board surface display and allows the Air Traffic Controller to reset the SMART Board from the controller's location. The status of each SMART Board surface display is displayed on the ASAP 76. The sensor 70 signal can be automatically sent simultaneously to the SMART Board surface display and to the tower cab or automatically routed through EFDS to both displays. Additionally, a visual indication of the tripped sensor on the airport layout plan can be sent to a computer 74, if there is no requirement for a message to be displayed to a vehicle.

The status of sensors and SMART Board surface displays are shown on the Airport Status and Alert Panel (ASAP) 76. The ASAP is comprised of a monitor device which shows the airport layout plan modified to include salient sensor and SB locations. Data displayed on the panel identifies which sensor(s) are activated, and current status, including the Display identifier and the current message. An optional configuration uses only the sensors and ASAP, and therefore would not have Display surface display status features. The ASAP permits automatic SMART Board surface display reset via one screen touch.

Figure 8:
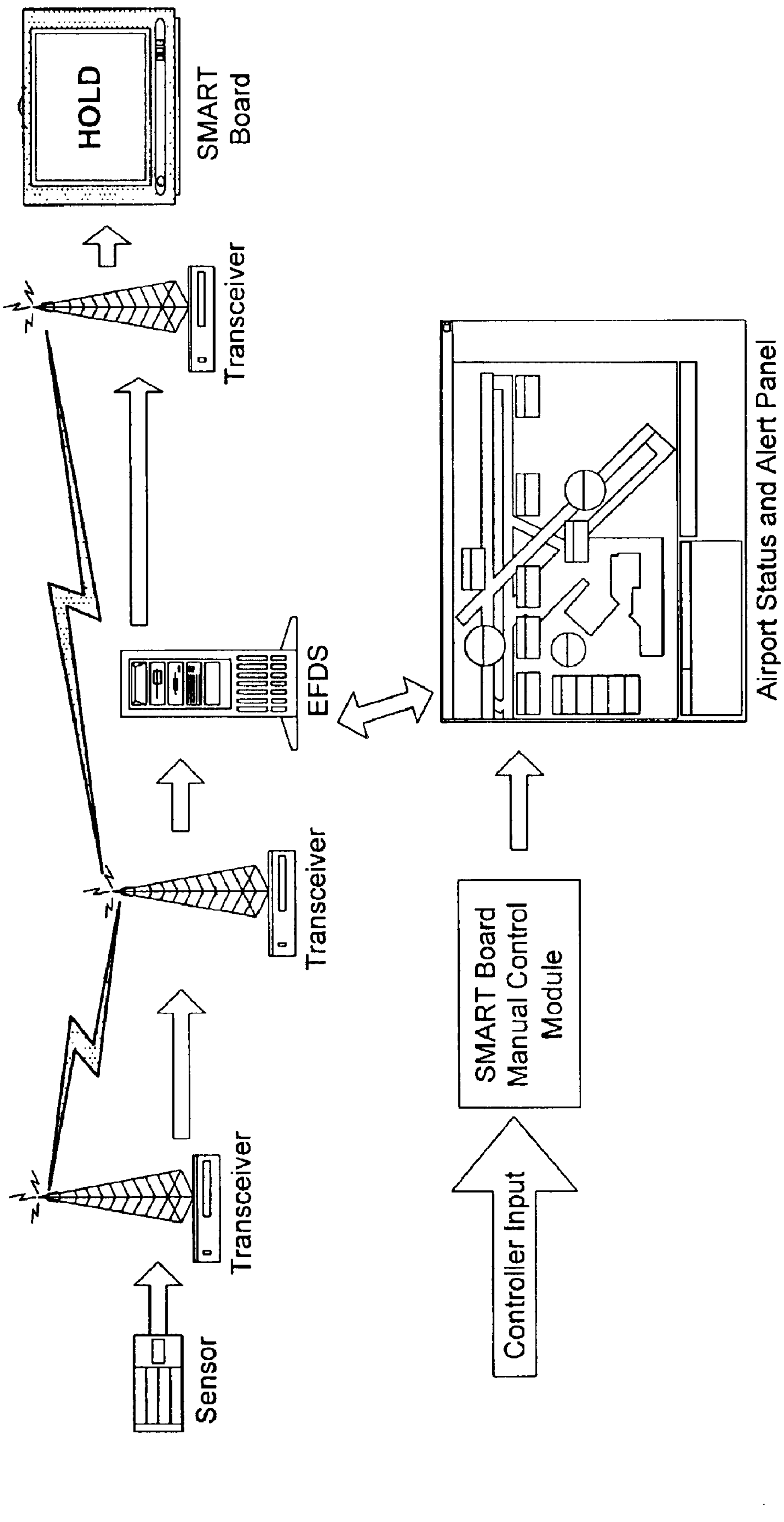
FIG. 8 is an Alert Management Configuration According to Another Embodiment of the Present Invention.

FIG. 8 illustrates the ALERT MANAGEMENT SYSTEM CONFIGURATION. The functions of the sensors, transceivers and computer hardware are the same as in FIG. 7A. This configuration adds significant additional management functions for the Air Traffic Controller. The airport surface management area is segmented to permit the controller to "protect" an active runway, for example, or to "shut down" the entire airport surface management area. Any action requires only one Air Traffic Controller touch; the rest of the operation is automatic. If required, each SMART Board surface display may be individually addressed by the Air Traffic Controller and, using a touch sequence, a preprogrammed message and the destination SMART Board surface display may both be selected. As before, the rest of the operation is automatic. In this configuration, if a runway incursion event is unfolding, one Air Traffic Controller touch could cause all intersecting runways and taxiways to flash "HOLD," thereby protecting vehicles on the active runway. In this example, both configurations shown in FIGS. 7B and 8 can be configured to effect the same result automatically and without any Air Traffic Controller action required.

Individual gates or airport terminal areas may be adapted for inclusion on the touch-screen panel as well as the airport layout plan showing all SMART Board surface display locations and corresponding messages. A special "Signal Button" can be used to over-ride and disseminate a single selected message to all SMART Board surface displays on the airport. This message would be user-defined and site specific. Data displayed on the SMART Board surface displays located on the airport at the intersections of taxiways, runways, gates, and/or service roads will reflect the desired message selected by the Airport Manager (AMGR) from a message menu located on the ASAP.

Figure 9:
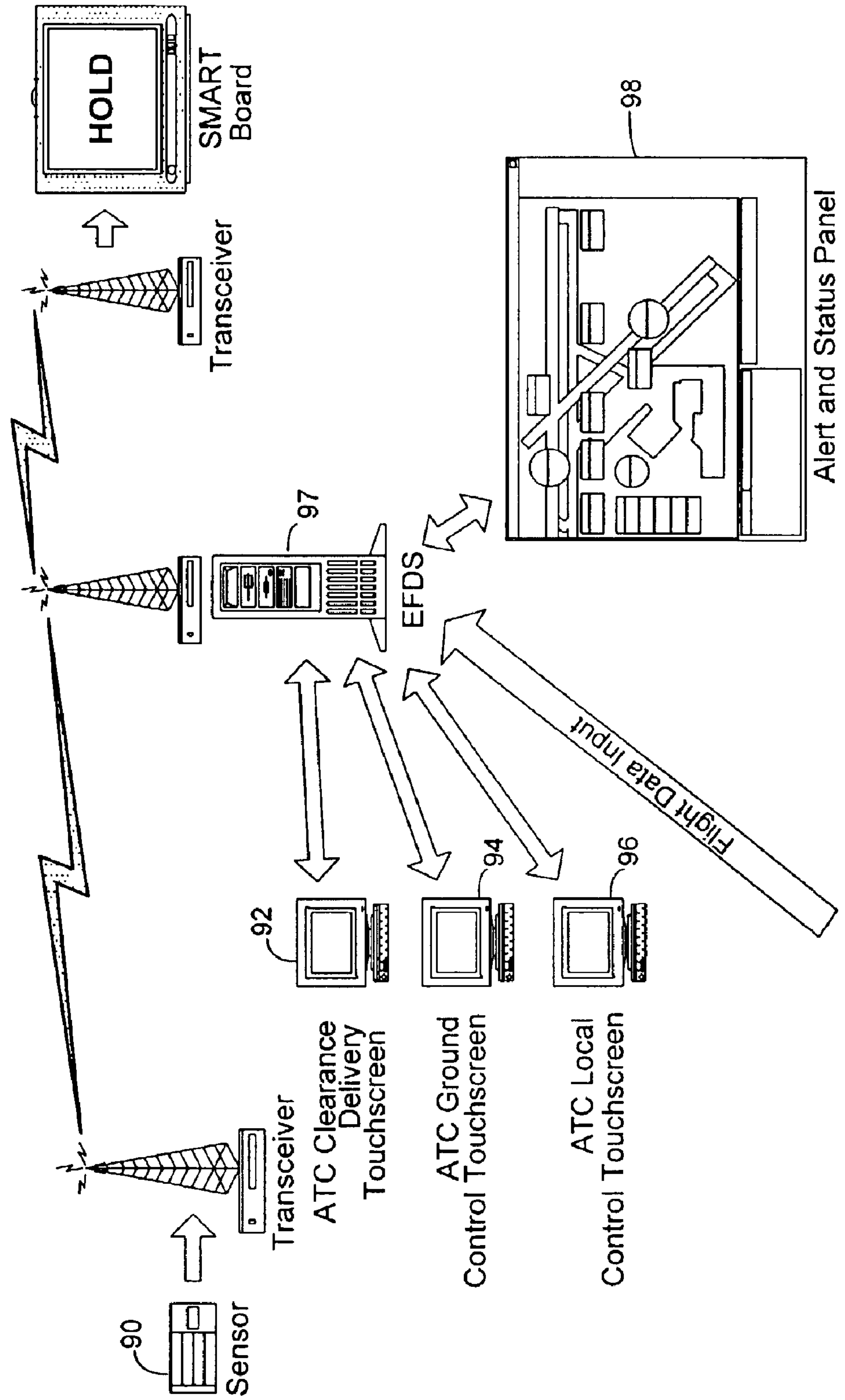
FIG. 9 is an Air Traffic Control and Alert Management System Configuration According to Another Embodiment of the Present Invention.

FIG. 9 illustrates an example of an AIR TRAFFIC CONTROL AND ALERT MANAGEMENT SYSTEM configuration. This configuration includes Air Traffic Control controller workstations 92, 94, 96. In this configuration, routine tower cab controller operations are automatically captured by the Electronic Flight Data System (EFDS) and messages are automatically transmitted for display on each operationally affected SMART Board surface display. Although operation is automatic, the Air Traffic Controller is required to conduct normal manual flight data activities using a touch screen at the Air Traffic Control workstations to feed the data to the subject system. The flight data activity augments the normal voice communications, and automates functions currently implemented by paper strip exchange activities (normal tower controller duties today).

The ASAP 98 in this configuration processes routine tower cab operations and automatically transfers data via the Electronic Flight Data System (EFDS) 97. Messages are automatically transmitted for display on each operationally affected SMART Board surface display. Tower controllers use a touch-screen in addition to their normal voice communications.

Touch-screen operation at the Air Traffic Control workstations allows approximately one or two touch applications to automatically route an out-bound flight to a runway or an inbound flight to its destination gate. Individual gates or airport terminal areas may be adapted for inclusion in ramp control operations using the touch-screen panel as well as the airport layout plan showing all SB signage location and corresponding messages. In the case of crossing runways, automatic confirmation of crossing, hold, or non-crossing taxi operations can be silently coordinated between a ground and local controller/s. Air Traffic Controller work station touch-screens are available in series or combinations; i.e., ground control and local control, local control, ground control, & clearance delivery, and ramp operations, or local control and combined clearance delivery/ground control.

Many of today's manual coordination activities are automated with the AIR TRAFFIC CONTROL AND ALERT MANAGEMENT SYSTEM configuration option. This system addresses complex site specific operations at a high activity 24/7 air-carrier airport. The control tower would employ at the minimum a clearance delivery, ground control, and local control workstations. In the case of dual parallel runways an additional ground and local position would be provided.

Figure 10A:
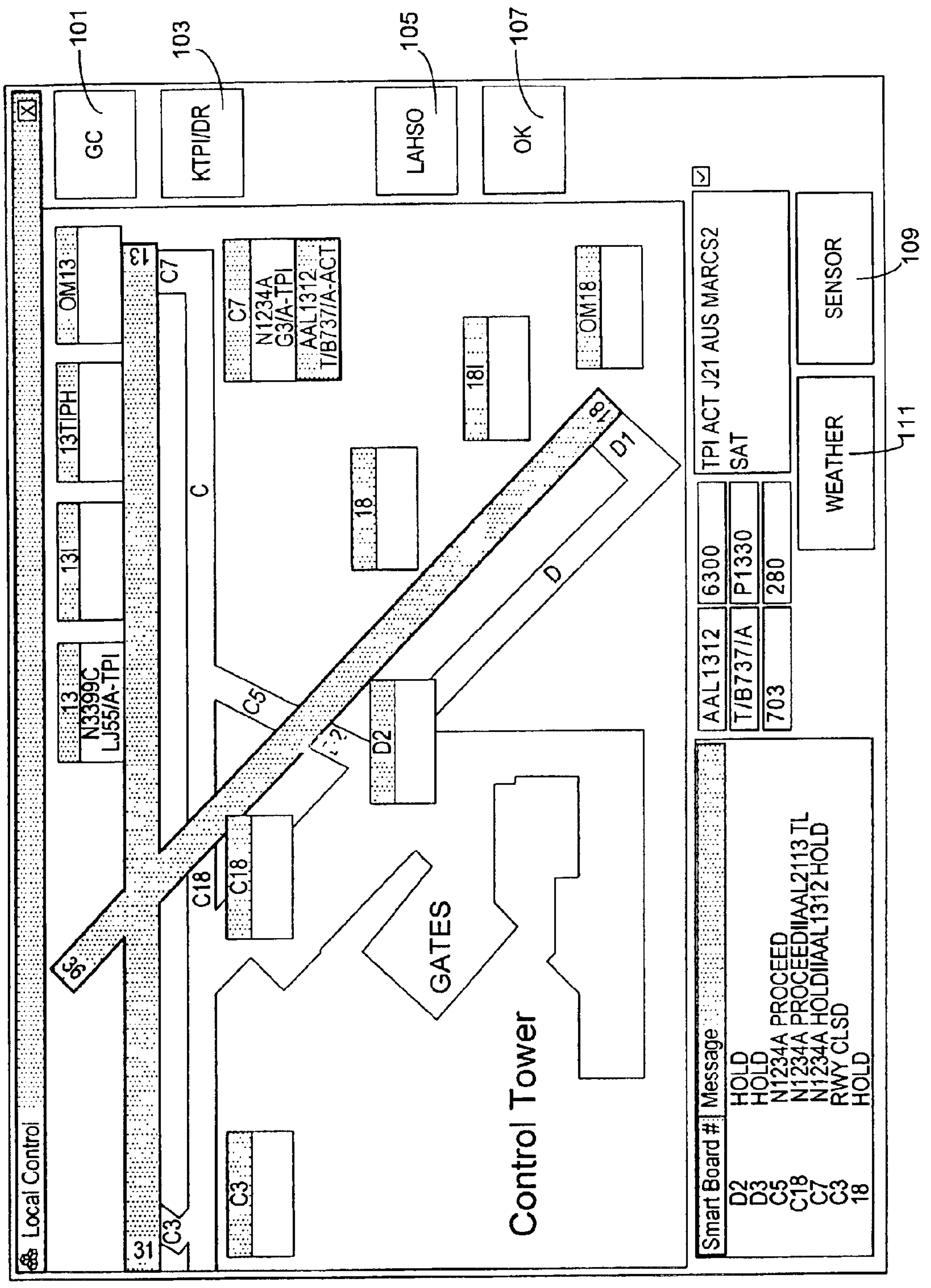
FIGS. 10A, 10B, 10C and 10D are Air Traffic Control Work Stations According to the Present Invention.

Shown in FIG. 10A is an example of a Air Traffic Controller Work Station. Routing queues that represent taxiways and runways are placed adjacent to the respective area on the screen. These queues contain the aircraft identifier (such as flight or tail number). The controller selects the aircraft to route by touching it in its queue, then routes it by touching the destination queue. A selected aircraft is depicted in blue, and its flight strip is shown in the lower right. When a runway is occupied, it is indicated with a red line.

The buttons on the right side are used to coordinate a transfer to another controller (GC button 101), or to departure radar (KTP/DR 103). A transfer from another controller is acknowledged with the OK button 107. A Land And Hold Short Operation (LAHSO) is made possible when a clearance to land is made in conjunction with touching the LAHSO button 105. Sensor or weather information is displayed on the work station; those options are selected on the bottom of the screen via sensor button 109 and weather button 111. The lower left side shows either the current SMART Board messages or weather information. When the WEATHER button is touched, the weather information is displayed and the button label is changed to SMART Board. Sensor data, such as trip wire indication, is displayed on the work station when the SENSOR button is touched.

Figure 10B:
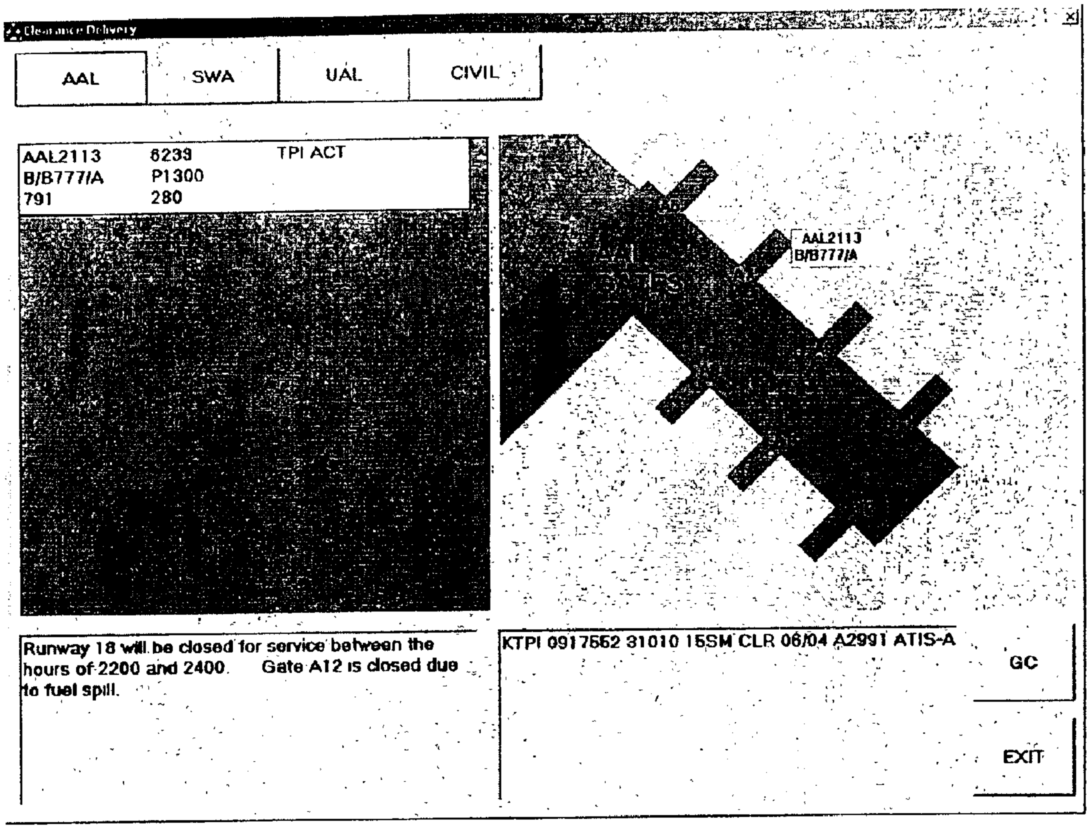
Figure 10C:
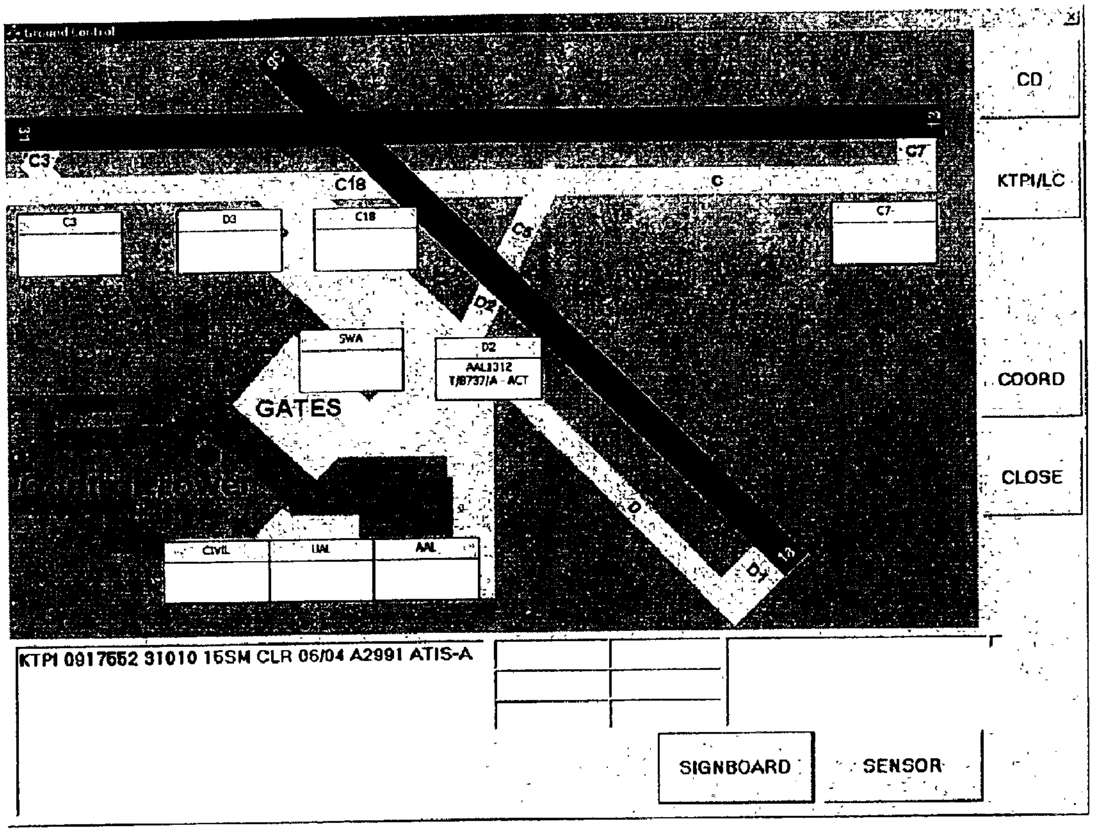
Figure 10D:
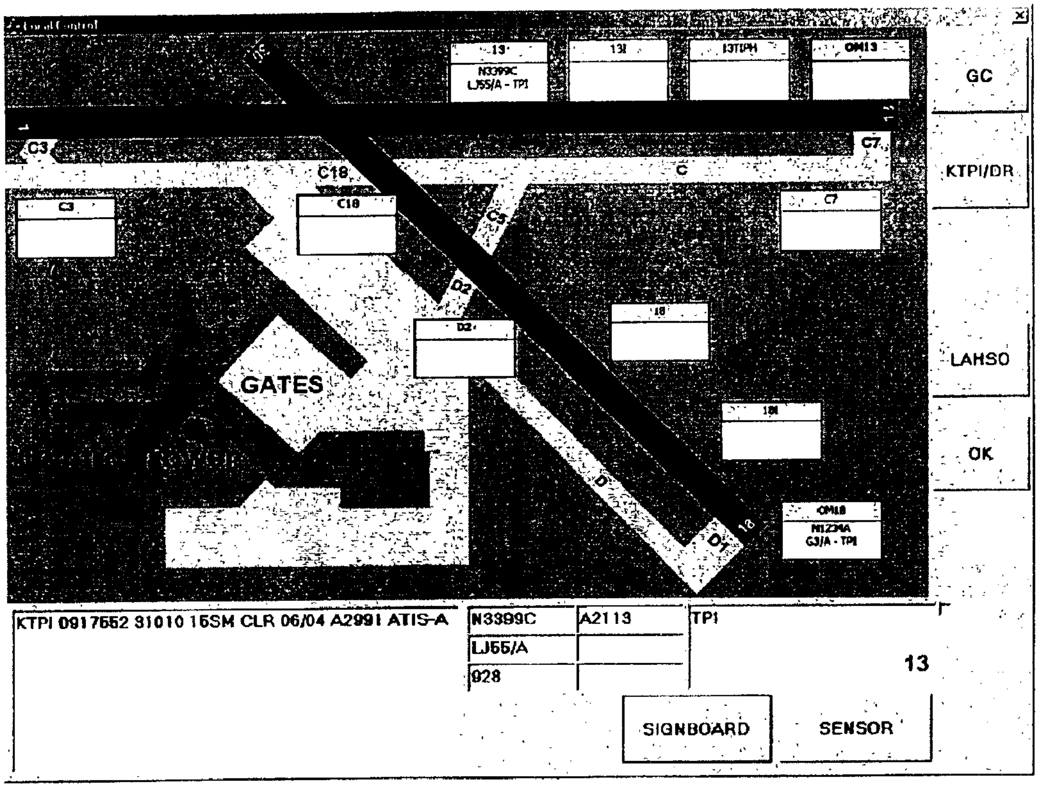

FIGS. 10B–10D illustrate examples of Customized Displays, Clearance Delivery, Ground Control and Local Control, respectively.

Figure 11:
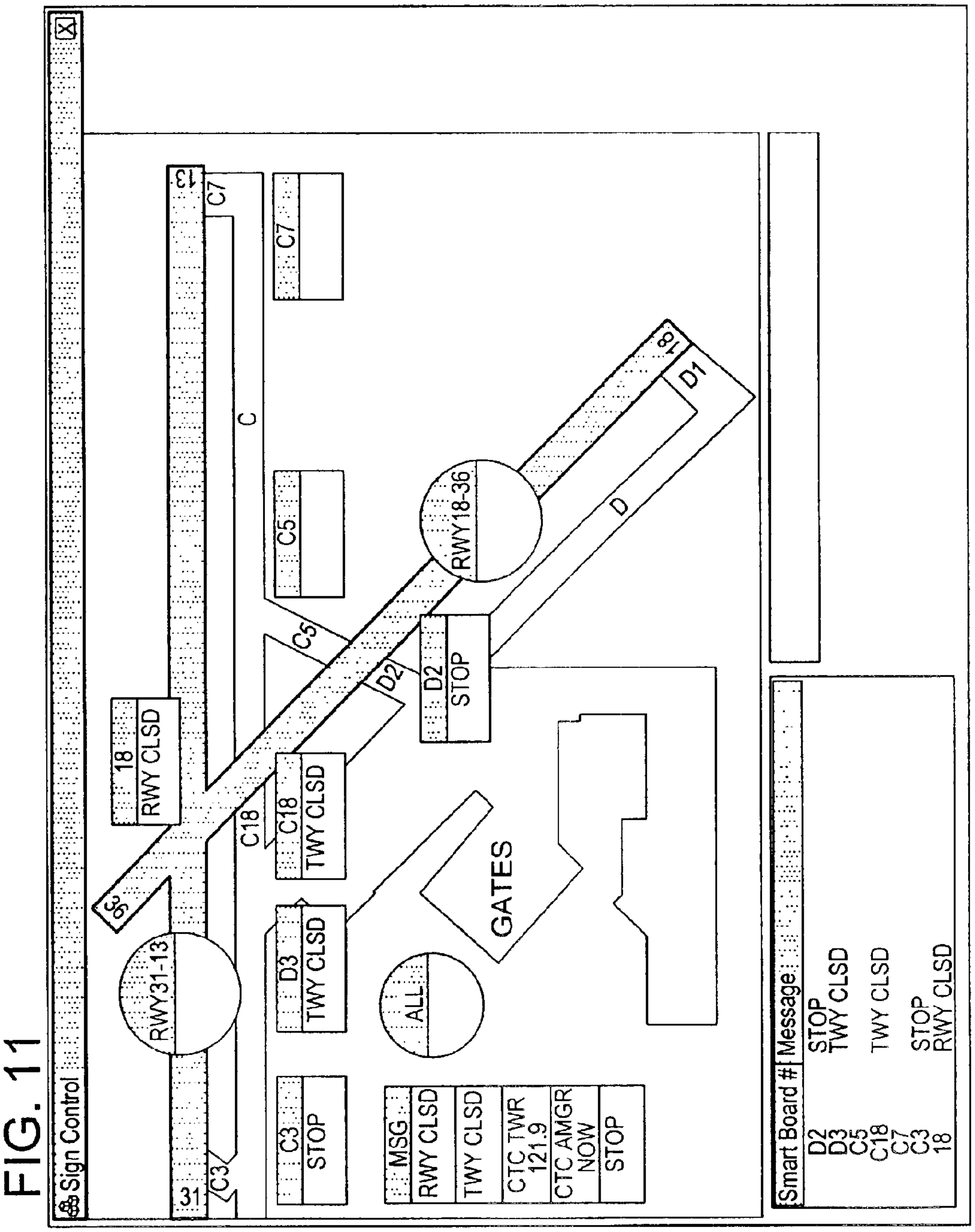
FIG. 11 is an ASAP—Airport Status and Alert Panel According to the Present Invention.

The Airport Status and Alert Panel (ASAP) shown in FIG. 11 is incorporated into the work station suite, and is deployable from any Air Traffic Control position. Dependent upon an airport's needs, configuration of the ASAP may be as simple as a single sensor status indicator, an indicator with a reset button, or an entire surface alert display.

As discussed above, a signal button controls a group of SMART Board surface displays, such as SMART Board surface displays adjacent to a particular runway. With one touch, the operator can place an emergency message, tailored to the operation in progress, on a group of SMART Board surface displays.

Manual control of the SMART Boards enables an operator in the Tower to select a message from a menu (labeled MSG) to place on one or a group of SMART Boards. The location of information and buttons on the display is reconfigurable.

Figure 12:
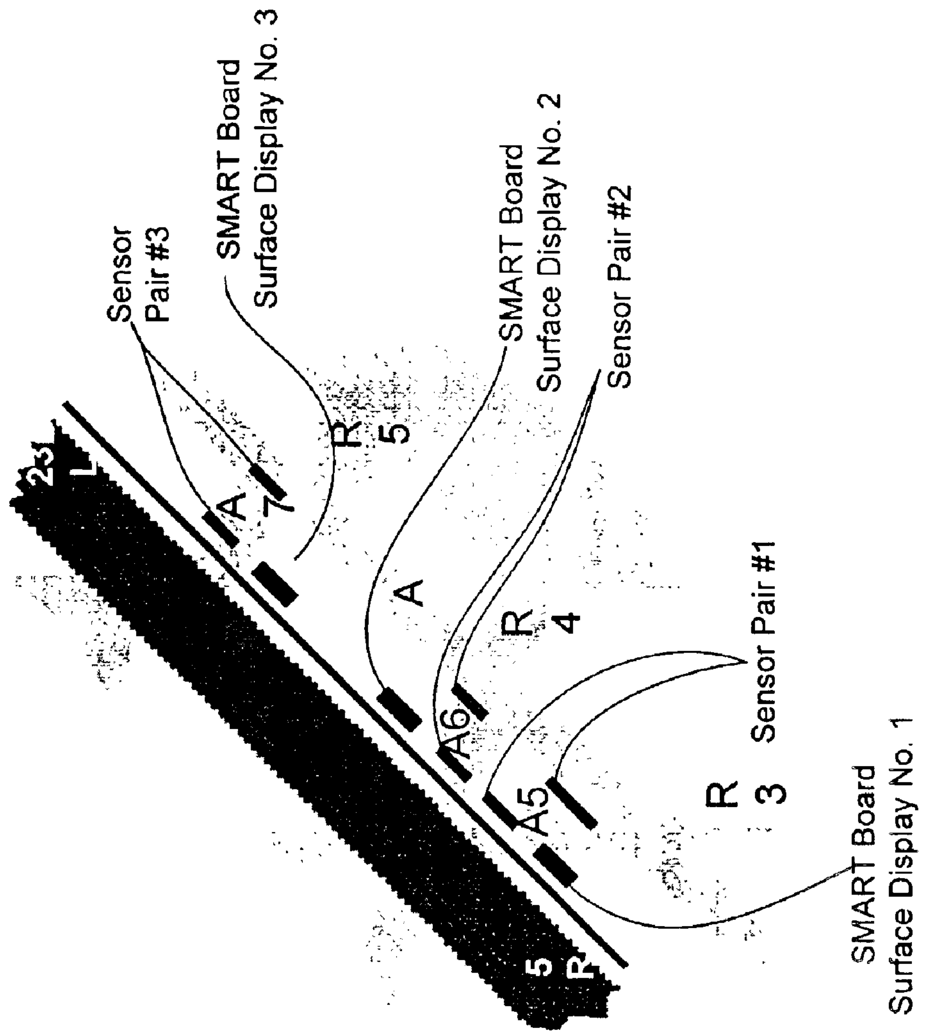
FIG. 12 is an Airport Layout According to the Present Invention.

A typical airport layout is illustrated in FIG. 12. SMART Board surface displays and sensors are located at various locations. SMART Board surface display No. 1 is located at juncture of taxiway A5 and runway 05R-23L facing taxiway A. SMART Board surface display No. 2 is located at the juncture of taxiway A6 and runway 05R-23L facing taxiway A. SMART Board surface display No. 3 is located at a juncture of taxiway A7 and runway A5R-23L facing taxiway A. When an aircraft activates the first sensor of sensor pair No. 2, a message will be generated and sent to SMART Board surface display No. 2. After the aircraft has passed the second sensor of sensor pair No. 2, the SMART Board surface display panel is reset.

Specifically, when the sensor is activated, a signal is sent to the EFDS database with the sensor identification and a time/day stamp. The database is updated, and a sensor status logic routine is engaged. This determines if the activation sets a tripped condition or if it resets a previous trip. A tripped condition will cause the SMART Board surface display to display a message. Conversely, a reset action will cause a SMART Board surface display to clear its message. The results of this routine are logged into the database, updating the sensor status table and SB message table. This information is conveyed to the affected display. The Display Message Driver Processor (DMDP) is updated with the current display messages and sensor status. The ASAP is similarly updated, and can also generate simulated sensor activations and ad hoc messaging, for system testing and evaluation purposes.

For the AIR TRAFFIC CONTROL AND ALERT MANAGEMENT SYSTEM configuration, the message is generated from the taxi instructions identified by the tower controller and the operation in progress. For the FIXED MESSAGE—FIXED LOCATION, the DIRECT SENSOR ACTIVATION, and the DIRECT SENSOR ACTIVATION WITH TOWER NOTIFICATION CONFIGURATION the message is pre-set for the location in the ASAP panel.

Figure 13:
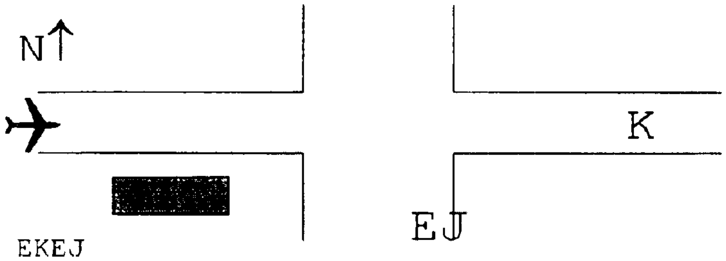
FIG. 13 is an example Flight Intersection Map According to the Present Invention.

FIG. 13 illustrates the nomenclature used in the airport mapping tables. As shown, the aircraft is facing East on taxiway Kilo (EK represents the surface the aircraft is on and its heading). The crossing taxiway is Echo Juliet (EJ). FIG. 14 illustrates a mapping table according to the present invention. Additional mapping tables that specify the predetermined directions to be sent to each sign at each intersection along the route from a Starting Point (S) to a Destination (D) can be used. Each mapping table lists the turn directions for a specified airport flow direction or adapted configuration. For example, separate tables may be needed for routing to a runway dependent on Instrument Flight Rules (IFR) versus Visual Flight Rules (VFR), and differences in wind direction and speed.

Each row in the table is an S-D route. The columns of the table are the sign locations and headings that designate which way to turn along that route to get from the S to the D. The alternate and ad hoc routes can also be stored in the table. The top table shows an outbound S-D route from ramp location K7 to runway 17R (departure end); the bottom table shows a route for K7 to the opposing takeoff direction, runway 35L (departure end).

The mapping tables that specify the predetermined directions to be sent to each sign need to be set up for each flow configuration. The mapping tables identify the turn directions for each S-D pair that may occur in a specific flow configuration.

The software is designed to use the operator input of an aircraft and its current location in the system, add the destination from the second operator input, and return to the table to pick up the route turn instructions as depicted. EFDS packages this as a message to the DMDP. DMDP uses the aircraft information and the turn information as a message, picking the IP address of the LAN locations of the appropriate SMART Board surface displays from the intersections in the table.

EFDS is also capable of purging aircraft information. Once an aircraft has passed from one controller to another, all the former route designators can be deleted from the DMDP. EFDS is also capable of sending specific THPH/CROSS/HOLD messages by aircraft ID to the appropriate Runway SMART Boards. For example, the rules of display at the Air Traffic Controller Local Controller Workstation are:

1. Aircraft who are on crossing taxiways and are handed off to Local all see their aircraft identification in a sequence to cross the runway as they approach the runway. This identifies that the aircraft is at the proper (cleared) location. As the aircraft is picked up by the sensor, the sign will display a HOLD instead of an arrow at the intersection to the runway. That is, the taxiway signs provide arrows up to the runway intersection, the runway signs provide identification and sequence information and then the runway signs switch by the sensors to provide awareness of runway clearances (HOLD vs. CROSS). Instead of an UP arrow (↑) on the SMART Board, the pilots will initially see HOLD. When Local gives the runway to the aircraft(s) [there may be multiples crossing at one time], the sign becomes CROSS, actuated by the touching of the screen in the tower by the Local Controller. For crossing aircraft, the rest of the route (segment past the runway) is shown as a new route when Local hands the aircraft off to the next Ground controller working taxiways past this runway.
2. Aircraft that are departing and are handed off to Local all receive a HOLD instead of an arrow at the intersection to the departure end of the runway. That is, they follow taxiway sign arrows up to the departure end of the runway. Instead of an UP arrow (↑) on the SMART Board, they will initially see their ID, a sequence number and the word HOLD. When Local gives the runway to the aircraft, the sign becomes Taxi into Position and Hold (TXPH). As Local clears the aircraft to takeoff, another touch on the screen will change the runway traffic light to green.

The pilot follows the taxiway SMART Board surface display turn information up to the Runway SMART Boards surface display. The Runway SMART Board Displays display the aircraft in queue for departure on the runway and they provide the instruction, for example, TXPH/CROSS/HOLD instructions to the top aircraft in the list. Aircraft crossing the runway are given the sign to HOLD until the Local Controller clears these aircraft to CROSS. Aircraft taking off will HOLD until cleared to TXPH.

Two more routing modes are always available to the Air Traffic Controller besides the adapted route information, an Ad Hoc route, and an Alternate route. The Ad Hoc route allows the Air Traffic Controller to specify an alternate to the preset route for a single aircraft by identifying taxiway sequences up to the departure end of the runway. The Alternate routing stores the ad hoc routes for re-use for more than one aircraft. The alternate routing is saved IN ADDITION TO the adapted route. A separate alternate routing is saved for each adapted route in the system.

Figure 15:
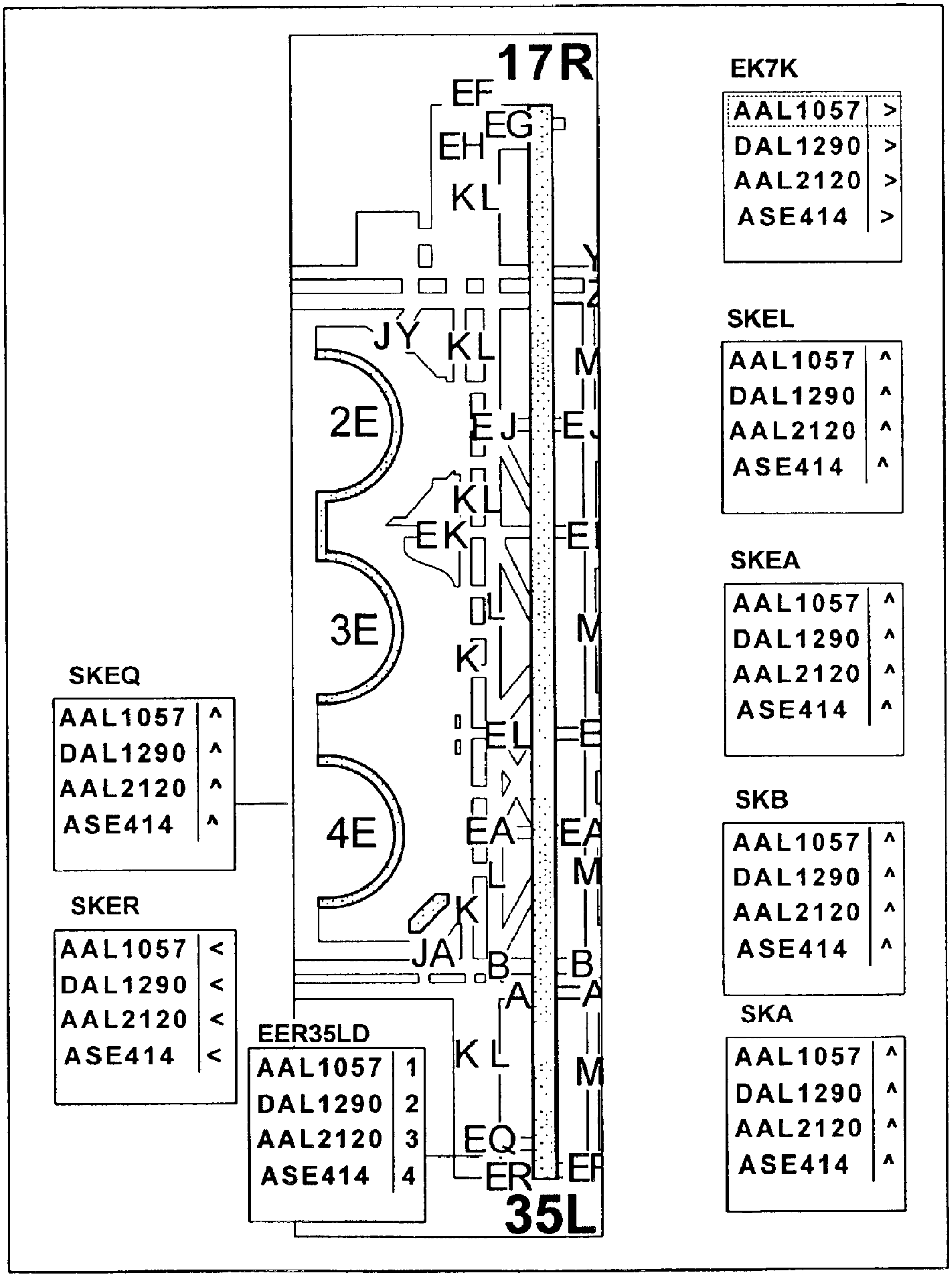
FIG. 15 is a SMART Board Sign Guidance to Aircraft According to the Present Invention.

As shown in FIG. 15, normally, the operator uses the default (adapted) settings for route (turn instructions) determination by selecting the aircraft and selecting the path (or location) that it is assigned. For example, the Ground Controller can pick up the aircraft at ramp position K7 and tell it to got to the departure end of runway 35L by touching 35LO (outbound) on the Ground controller's touch screen (shown on mapping table).

Should the operator decide to route the aircraft another way to 35LO, additional touches allow the controller to do so. In this case (see figure), the controller decides to route the aircraft along taxiway K to a left turn on taxiway EL to cross over to taxiway L and follow L to the 35LO. The sequence entered by the Air Traffic Controller is [Aircraft# at K7], K, EL, L, 35LO. The EFDS assembles the appropriate turn directions from stored values in each of the route segments. This is ad hoc routing. The routing can be saved as an alternate routing from K7 to 35LO if the controller desired to do so. The controller can then use both the default routing and the alternate routing for the K7-35LO path. SMART Board surface displays obtain messages either by automatic means (such as a sensor) or manually, via the message menu or panic buttons.

The present invention preferably uses a touch screen system for the operational air traffic controller positions, i.e., Clearance Delivery (CD), Ground Control (GC), and Local Control (LC), which provide a display of the total airport Surface Movement Area (SMA) including runway, taxiway, and ramp layouts. This system captures the Air Traffic Controller's intent (clearances and route) and aircraft's intent (destination, first departure fix or arrival gate) in the operation of the SMART Board surface displays. The SMART Board surface displays automatically display the correct navigation instructions to the pilot during the progress of the aircraft on the taxi route. The system supports Air Traffic Controller and aircraft intent during all surface movement. SMART Board surface displays obtain input from Air Traffic Controller actions as well as automation input and are able to display multiple aircraft ACID and directions for ALL aircraft operating on the airport surface. The key location of the SMART Board surface displays on the airport surface is displayed on the touch screen as well. Multiple transition queues are provided on each controller position and several overlap between positions and are used to transition aircraft between Air Traffic Controllers thus providing silent coordination. The Clearance Delivery touch screen also provides other information for the Air Traffic Controller, i.e., NOTAMS, temporary runway or taxiway closures, etc.

The present invention supports all normal aircraft operations and controller instructions, i.e., HOLD, PROCEED, TIPH, CTKOF, LAHSO, TL, TR, etc. The present invention is also capable of handling a complex operation such as an aircraft landing and holding short of another runway LAHSO. During the same time the LAHSO is in process the system is capable of providing direction to multiple aircraft on the airport surface automatically. The Aircraft Identification (ACID) for each individual instruction is provided automatically to avoid any misunderstandings. For example, the present invention is capable of displaying the ACID, type, and initial or first fix (after departure) on the controller displays along the taxi route.

The purpose of SMART Boards is to provide a measure of runway incursion protection by improving pilot situational awareness. As aircraft land, take off and transit the SMART Board protected Surface Movement Area (SMA), the system automatically creates operational data which are then displayed on applicable SMART Board surface signs. These SMART Boards are read by personnel aboard aircraft and other vehicles on the SMA. These visual guidance aids provide a greater measure of situational awareness for all vehicles; validate navigational directions and locations; and serve as information delivery mechanism for special situations. In providing these capabilities, the SMART Board System provides safer and better management of the SMA for all vehicles. The present invention improves the efficiency of surface movement and in so doing also increases the airport's capacity to accommodate larger numbers of aircraft. SMART Boards fully support current Air Traffic procedures.

The number of SMART Board surface displays located on the airport movement surface is limited only by the operational need. SMART Board surface displays can be deployed in five major configurations, ranging from fixed location stand-alone to complete support of Tower Cab Air Traffic Control operations.

SMART Board surface displays have no limitations due to airport size, complexity or terrain, and have several airport and aircraft specific advantages for improving surface movement and protecting against runway incursions. Although SMART Board surface displays provide navigation and control services in virtually any airport level environment in which a source of inbound and outbound aircraft are available, there are three areas in which SMART Board surface displays are particularly effective: airports with frequent low-visibility conditions; airports with a high percentage of mixed general aviation (GA), business, sport, and airline traffic; and airports that undergo frequent changes in flow or are in the process of making configuration changes to the surface movement area.

Since there are no aircraft special equipment requirements, SMART Board surface displays accommodate a mix of aircraft and operators. Airports having a significant mix of aircraft types will be able to enjoy an increased level of runway incursion safety by knowing more positive guidance will be delivered to all aircraft, regardless of equipage, reducing errors from lost aircraft and providing an extra measure of runway occupancy status to all operators.

Another useful capability of SMART Board surface displays is to assist in turning an airport around and setting up semi-permanent routing to accommodate construction and temporary weather or traffic flow conditions such as deicing procedures or accommodating "parking lot" conditions when congested. SMART Board surface displays can easily accommodate new routing and ad hoc changes in flow for temporary conditions. As the signs visually provide new navigational directions, the frequency does not need to be shared with this duty and can be used to direct other traffic and weather activities. SMART Board surface displays can deliver weather-related surface conditions and temporary routing instructions to pilots for de-icing operations.

To help reduce runway incursions, SMART Board surface displays provide additional situational awareness to aircraft in dependent runway operations, such as parallel and intersecting runways (Land Hold Short Operations (LAHSO). SMART Board surface displays maintain safety and surface flow around and through temporary construction zones. SMART Board surface displays can be adapted to deliver wake vortex advisories and route instructions dependent upon aircraft type or class, equipped or not. Aircraft type identifiers are flight plan components already in the system.

Several embodiments have been presented. This invention, however may be embodied in many different forms and should not be construed as limited to the embodiments discussed above. For example, the system could include additional features such as a barrier method that prevents the surface vehicle from taking an unauthorized route. Therefore, the disclosed embodiments are provided so that this disclosure will be thorough and complete and will fully convey the scope of the invention to those skilled in the art.

What is claimed is:

1. An airport surface traffic management system comprising:

means for detecting a position of vehicles on the airport surface;

means off of the vehicle for transmitting the vehicle positions;

means for providing location-specific information to all vehicles based on their relative location on the airport surface;

means for controlling the vehicles on the airport surface; and means for interfacing the means for providing location-specific information and the means for controlling.

2. The airport surface traffic management system according to claim 1 wherein the means for detecting is at least one of an inductive loop, infrared sensor, trip-wire, RF sensor, microwave sensor or RADAR.

3. The airport surface traffic management system according to claim 1 wherein the means for interfacing is at least one of a wireless LAN or a hard-wired system.

4. The airport surface traffic management system according to claim 1 wherein the means for providing location-specific information includes programmable LED alphanumeric signs.

5. The airport surface traffic management system according to claim 4 wherein the alpha-numeric signs are programmed to display at least one of navigational messages, guidance messages, alert and warning messages, or Air Traffic Controller informational messages.

6. The airport surface traffic management system according to claim 1 wherein the means for controlling the vehicle controls at least one of tracking the vehicle location, generating specific route confirmation or delivering specific Air Traffic Controller instructions.

7. The airport surface traffic management system according to claim 1 wherein the means for controlling further includes graphical display means.

8. The airport surface traffic management system according to claim 7 wherein the graphical display means displays at least one of sensor status, vehicle location, vehicle route destination and sequence or alerts and warnings.

9. The airport surface traffic management system according to claim 1 wherein the means for interfacing operates in the frequency band of between 5.09 GHz and 5.15 GHz.

10. An airport surface traffic management system comprising:

position detecting device for detecting a position of vehicles on the airport surface;

an off-vehicle transmitter for transmitting the detected positions;

information delivering device for providing location-specific information to the vehicles;

controller for controlling the vehicles on the airport surface; and interfacing device for interfacing the information delivering device and the controller.

11. The airport surface traffic management system according to claim 10 wherein the position detecting device is at least one of an inductive loop, infrared sensor, trip-wire, RF sensor, microwave sensor or RADAR.

12. The airport surface traffic management system according to claim 10 wherein the interfacing device is at least one of a wireless LAN or a hard-wired system.

13. The airport surface traffic management system according to claim 10 wherein the information delivering device includes programmable LED alpha-numeric signs.

14. The airport surface traffic management system according to claim 13 wherein the alpha-numeric signs are programmed to display at least one of navigational messages, guidance messages, alert and warning messages, or Air Traffic Controller informational messages.

15. The airport surface traffic management system according to claim 10 wherein the controller controls at least one of tracking the vehicle location, generating specific route confirmation or delivering specific Air Traffic Controller instructions.

16. The airport surface traffic management system according to claim 10 wherein the controller further includes graphical display means.

17. The airport surface traffic management system according to claim 16 wherein the graphical display means displays at least one of sensor status, vehicle location, vehicle route destination and sequence or alerts and warnings.

18. The airport surface traffic management system according to claim 10 wherein the means for interfacing operates in the frequency band of between 5.09 GHz and 5.15 GHz.

19. A method of performing airport surface traffic management including the steps of:

detecting position of vehicles on the airport surface;

transmitting vehicle position data from off of the vehicle to a controller;

verifying vehicle position data at the controller;

generating specific vehicle location and route data at the controller;

transmitting navigational and identification information to the vehicles;

assigning and displaying runway usage information to the vehicles on the airport surface; and detecting vehicle movement on the airport surface that conflicts with the assigned runway usage information.

20. The airport surface traffic management system according to claim 19 wherein the step of detecting position of vehicles detects via at least one of an inductive loop, infrared sensor, tripwire, RF sensor, microwave sensor or RADAR.

21. The method of performing airport surface traffic management according to claim 19 wherein the step of transmitting transmits vehicle position data to the controller via at least one of a wireless LAN or a hard-wired system.

22. The method of performing airport surface traffic management according to claim 19 wherein the step of assigning and displaying displays the specific vehicle location and route data by programmable LED alpha-numeric signs.

23. The method of performing airport surface traffic management according to claim 22 wherein the alpha-numeric signs are programmed to display at least one of navigational messages, guidance messages, alert and warning messages, or Air Traffic Controller informational messages.

24. The method of performing airport surface traffic management according to claim 19 wherein the step of generating further includes the step of generating Air Traffic Controller instructions.

25. The method of performing airport surface traffic management according to claim 20 wherein the step of verifying verifies the vehicle position data by checking detector status.

26. The method of performing airport surface traffic management according to claim 19 wherein the step of transmitting transmits vehicle data in the frequency band of between 5.09 GHz and 5.15 GHz.

27. The method of performing airport surface traffic management according to claim 19 further comprising the steps of:

relaying runway usage clearances to all vehicles on the airport surface;

processing unauthorized vehicle movement and identifying as a conflict with the assigned vehicle usage of the runway;

displaying alert information in response to conflicts with assigned runway usage information to the controller; and outputting alert information in response to conflicts with assigned runway usage information.

28. The method of performing airport surface traffic management according to claim 19 wherein the step of assigning and displaying runway usage information to vehicles on the airport surface simultaneously displays the occupation status of the runway as open for all vehicles crossing or entering the runway, or closed when a vehicle is on the runway or about to enter the runway.

29. The method of performing airport surface traffic management according to claim 21 wherein the step of relaying runway usage clearances to all vehicles relays approved Air Traffic control clearance information to specific vehicles or groups of vehicles by identification number.

30. The method of performing airport surface traffic management according to claim 21 wherein alert information includes runway incursion alerts.

* * * * *